(12) United States Patent
Shiotani et al.

(10) Patent No.: US 11,181,439 B2
(45) Date of Patent: Nov. 23, 2021

(54) STRUCTURE EVALUATION SYSTEM AND STRUCTURE EVALUATION METHOD

(71) Applicants: Kabushiki Kaisha Toshiba, Minato-ku (JP); Kyoto University, Kyoto (JP)

(72) Inventors: Tomoki Shiotani, Kyoto (JP); Katsufumi Hashimoto, Kyoto (JP); Hidefumi Takamine, Shinagawa (JP); Kazuo Watabe, Yokohama (JP)

(73) Assignees: Kabushiki Kaisha Toshiba, Minato-ku (JP); Kyoto University, Kyoto (JP)

( * ) Notice: Subject to any disclaimer, the term of this patent is extended or adjusted under 35 U.S.C. 154(b) by 175 days.

(21) Appl. No.: 16/551,857

(22) Filed: Aug. 27, 2019

(65) Prior Publication Data

US 2019/0383696 A1    Dec. 19, 2019

Related U.S. Application Data

(63) Continuation of application No. PCT/JP2018/007314, filed on Feb. 27, 2018.

(51) Int. Cl.
| | |
|---|---|
| *G01M 5/00* | (2006.01) |
| *G01N 29/44* | (2006.01) |
| *G01N 29/14* | (2006.01) |

(52) U.S. Cl.
CPC ........ *G01M 5/0066* (2013.01); *G01M 5/0008* (2013.01); *G01M 5/0033* (2013.01);
(Continued)

(58) Field of Classification Search
CPC ............. G01M 5/0066; G01M 5/0008; G01M 5/0033; G01M 7/08; G01N 29/14; G01N 29/4463; G01N 29/4427
See application file for complete search history.

(56) References Cited

U.S. PATENT DOCUMENTS

| 2004/0035218 | A1* | 2/2004 | Paulson | ................. | G01N 29/46 |
| | | | | | 73/803 |
| 2013/0312526 | A1* | 11/2013 | Oishi | .................... | G01N 29/26 |
| | | | | | 73/620 |

(Continued)

FOREIGN PATENT DOCUMENTS

| EP | 3 264 076 A1 | 1/2018 |
| JP | 52-33788 A | 3/1977 |

(Continued)

OTHER PUBLICATIONS

Behnia et al, "Advanced structural health monitoring of concrete structures with the aid of acoustic emission", Construction and Building Materials 65 (2014) 282-302 (Year: 2014).*

(Continued)

*Primary Examiner* — Stephanie E Bloss
(74) *Attorney, Agent, or Firm* — Oblon, McClelland, Maier & Neustadt, L.L.P.

(57) ABSTRACT

According to one embodiment, a structure evaluation system according to an embodiment includes a plurality of sensors, a position locator, and an evaluator. The plurality of sensors detect elastic waves. The position locator locates positions of elastic wave sources by using the elastic waves among the plurality of elastic waves respectively detected by the plurality of sensors having an amplitude exceeding a threshold value determined according to positions of the sources of the plurality of elastic waves and the positions of the plurality of disposed sensors. The evaluator evaluates a deteriorated state of the structure on the basis of results of the position locating of the elastic wave sources which is performed by the position locator.

3 Claims, 16 Drawing Sheets

(52) U.S. Cl.
CPC ......... *G01N 29/14* (2013.01); *G01N 29/4463* (2013.01); *G01N 29/4427* (2013.01)

(56) References Cited

U.S. PATENT DOCUMENTS

| | | | |
|---|---|---|---|
| 2016/0139084 A1* | 5/2016 | Usui | G01N 29/4445 |
| | | | 73/587 |
| 2017/0013891 A1 | 5/2017 | Usui et al. | |
| 2017/0138910 A1* | 5/2017 | Usui | G01N 29/07 |
| 2017/0336364 A1* | 11/2017 | Watabe | G01N 29/14 |
| 2017/0363586 A1* | 12/2017 | Takamine | G01N 29/043 |
| 2021/0181157 A1* | 6/2021 | Takamine | G01N 29/2437 |

FOREIGN PATENT DOCUMENTS

| | | |
|---|---|---|
| JP | 2004-125721 A | 4/2004 |
| JP | 2015-224891 A | 12/2015 |
| JP | 2017-90311 A | 5/2017 |
| WO | WO 2017/199544 A1 | 11/2017 |

OTHER PUBLICATIONS

Spall et al, "Neural Network Approach to Locating Acoustic Emission Sources in Nondestructive Evaluation" Proceedings of the American Control Conference Philadelphia, Pennsylvania Jun. 1998 (Year: 1998).*

* cited by examiner

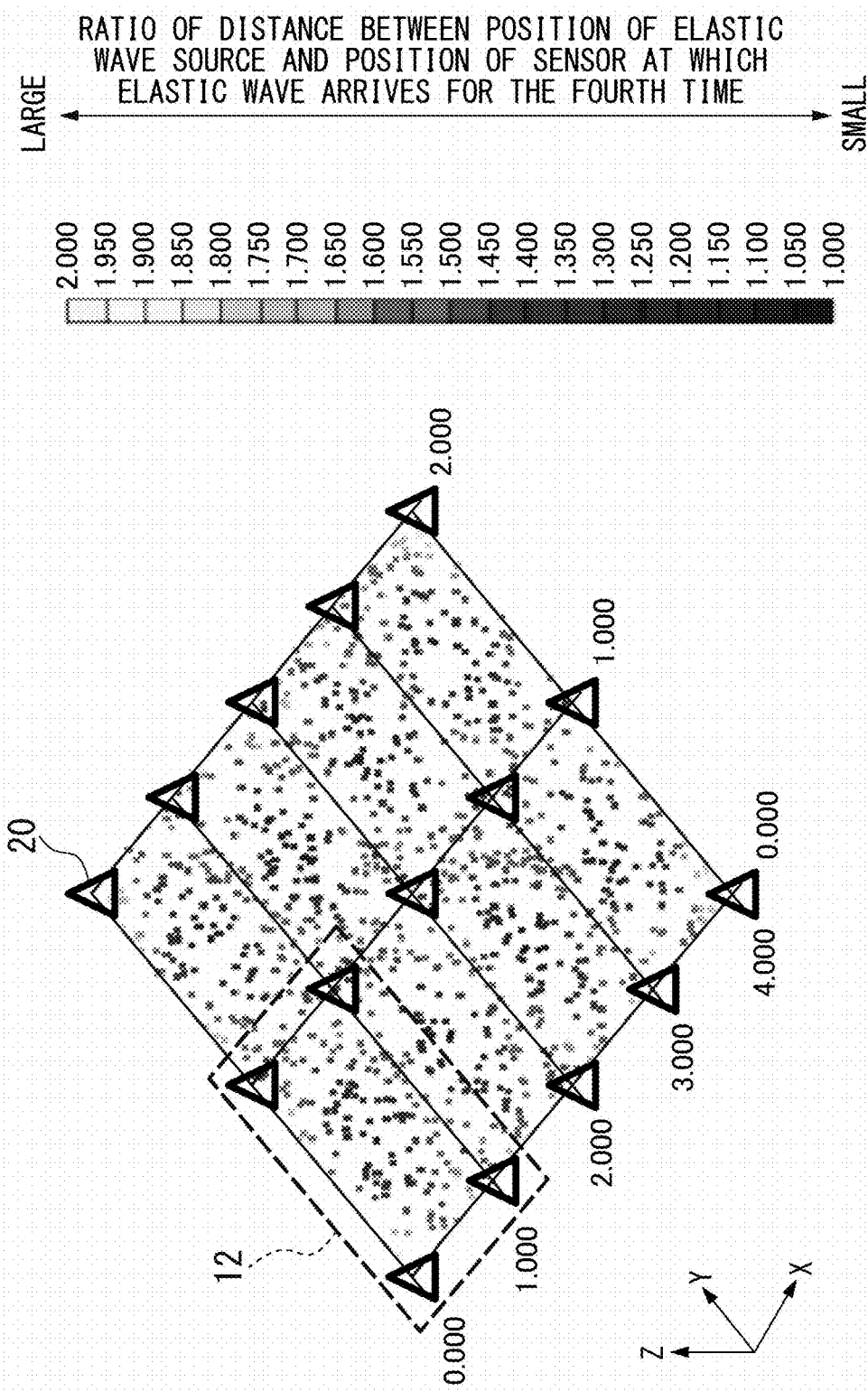

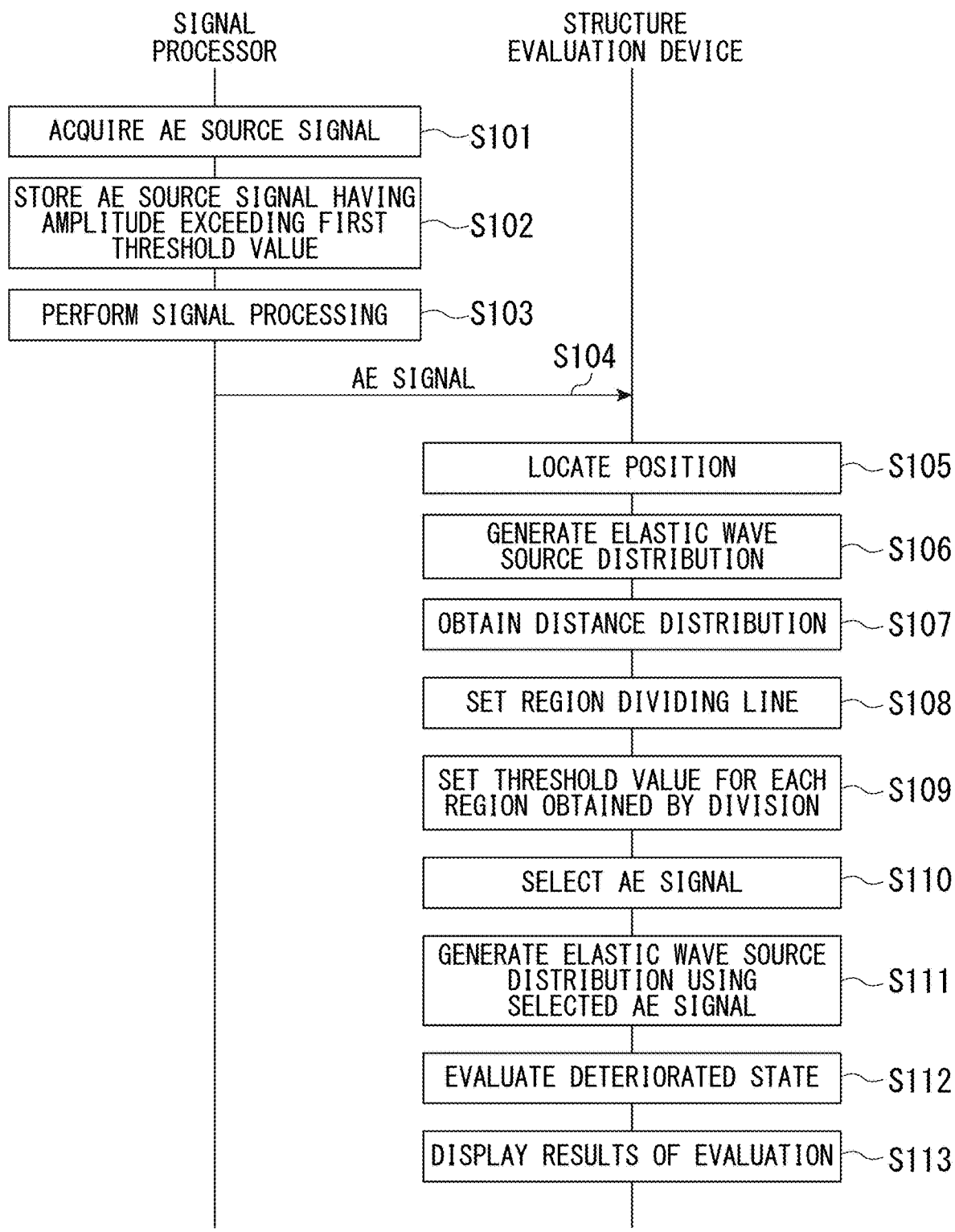

STRUCTURE EVALUATION SYSTEM AND STRUCTURE EVALUATION METHOD

CROSS-REFERENCE TO RELATED APPLICATION

This is a Continuation Application of International Application PCT/JP2018/7314, filed on Feb. 27, 2018, and the entire contents of all of which are incorporated herein by reference.

FIELD

Embodiments of the present invention relate to a structure evaluation system and a structure evaluation method.

BACKGROUND

By installing a sensor such as an AE sensor on the surface of a structure such as a bridge, it is possible to detect an elastic wave generated from a damaged part inside the structure. By further installing a plurality of sensors, it is possible to locate the position of an elastic wave source (hereinafter, referred to as an "elastic wave source") from a difference in an elastic wave arrival time between the sensors. In addition, the same elastic wave is generated also by imparting an impact to the structure from the outside, and thus it is possible to locate the position of the elastic wave source. However, in a case where a propagation path of an elastic wave is damaged, the propagation of the elastic wave is disturbed, and thus the elastic wave cannot be detected by the sensors. As a result, it is not possible to locate the correct position of the elastic wave source. By using such characteristics, it is possible to detect damage inside the structure from a disturbance of a distribution of elastic wave sources of which the positions are located. However, depending on the disposition of the sensors, the distribution of the elastic wave sources of which the positions are located from signals obtained by the sensors may not be uniform even when the structure is not damaged and an impact uniformly distributed as the elastic wave source is imparted to the structure from the outside. In this case, it may not be possible to correctly evaluate a deteriorated state of the structure.

BRIEF DESCRIPTION OF THE DRAWINGS

FIG. 6 is a diagram showing ratios of distances between the positions of elastic wave sources and the positions of sensors at which an elastic wave arrives fourth.
FIG. 7 is a sequence diagram showing a flow of processing of the structure evaluation system in the first embodiment.

DETAILED DESCRIPTION

The present invention provides a problem to be solved by the present invention is to provide a structure evaluation system and a structure evaluation method which are capable of improving the accuracy of evaluation of a deteriorated state of a structure.

According to one embodiment, a structure evaluation system according to an embodiment includes a plurality of sensors, a position locator, and an evaluator. The plurality of sensors detect elastic waves. The position locator locates positions of elastic wave sources by using elastic waves among the plurality of elastic waves respectively detected by the plurality of sensors having an amplitude exceeding a threshold value determined according to positions of sources of a plurality of elastic waves and the positions of the plurality of disposed sensors. The evaluator evaluates a deteriorated state of the structure on the basis of results of the position locating of the elastic wave sources which is performed by the position locator.

Hereinafter, a structure evaluation system and a structure evaluation method according to an embodiment will be described with reference to the accompanying drawings.

(First Embodiment)

Figure 1:
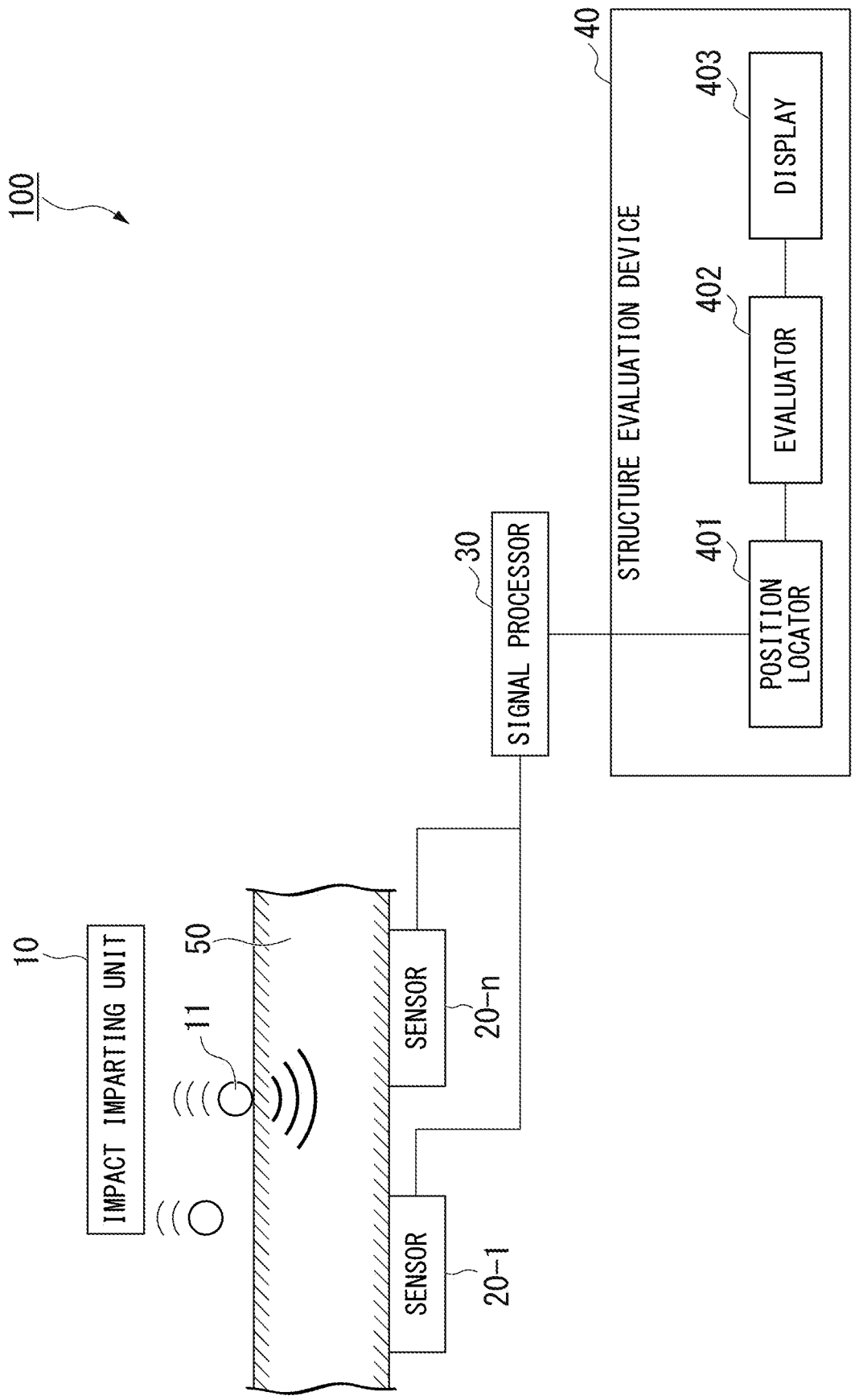
FIG. 1 shows a configuration of a structure evaluation system in a first embodiment.

FIG. 1 is a diagram showing a configuration of a structure evaluation system 100 in a first embodiment.

The structure evaluation system 100 is used to evaluate soundness of a structure. In the following description, evaluation means that the degree of soundness of a structure, that is, a deteriorated state of the structure is determined on the basis of a certain standard. Meanwhile, in the following description, a bridge will be described as an example of a structure, but the structure is not necessarily limited to a bridge. For example, a structure may be any structure as long as it generates an elastic wave due to the occurrence or development of cracks or an external impact (for example, rain, artificial rain, or the like). Meanwhile, the bridge is not limited to a structure which is built above a river, a valley, or the like, and also includes various structures (for example, viaducts on expressways) which are provided above the ground.

The structure evaluation system 100 includes an impact imparting unit 10, a plurality of sensors 20-1 to 20-$n$ ($n$ is an integer of 2 or greater), a signal processor 30, and a structure evaluation device 40. The signal processor 30 and the structure evaluation device 40 are communicatively connected to each other in a wired or wireless manner. Meanwhile, in the following description, the sensors 20-1 to 20-$n$ will be referred to as a sensor 20 in a case where it is not necessary to distinguish between the sensors.

The impact imparting unit 10 generates an elastic wave inside a structure 50 by imparting an impact 11 to the structure. The impact imparting unit 10 is, for example, a device provided in a vehicle such as truck traveling on the structure 50. The impact imparting unit 10 imparts a large number of impacts 11 so that a uniform distribution is made on a road surface of the structure 50. The impact 11 is imparted, for example, by spraying water drops, ice particles, solid matter, continuous hitting using a hammer, heating using a laser, or the like. In a case where the impact imparting unit 10 sprays water drops as the impartment of the impact 11, it is preferable to be able to control the size of water drops colliding with the road surface and a timing of collision by adjusting a nozzle and controlling an ejection timing. It is preferable to be able to control the strength and timing of the impact 11 such that they have desired values also in continuous hitting using a mallet such as a hammer.

The sensors 20 are installed on the structure 50. For example, the sensors 20 are installed on a surface opposite to a surface to which the impact imparting unit 10 imparts the impact 11. The sensor 20 including a piezoelectric element detects an elastic wave generated from the inside of the structure 50 and converts the detected elastic wave into an AE source signal which is a voltage signal. The sensor 20 performs processing such as amplification and frequency limiting on the AE source signal and outputs the processed signal to the signal processor 30. Meanwhile, an acceleration sensor may be used instead of the sensor 20. In this case, the acceleration sensor performs the same processing as that of the sensor 20 and outputs a signal having been subjected to signal processing to the signal processor 30. The thickness of the structure 50 is, for example, equal to or greater than 15 cm.

The signal processor 30 uses the AE source signal processed by the sensor 20 as an input. The signal processor 30 performs signal processing on an AE source signal having an amplitude value greater than a first threshold value determined to be higher than a noise level, among the input AE source signals. Specifically, first, in a case where a vibration greater than the first threshold value is detected, the signal processor 30 determines a signal for a predetermined period of time from a time when the first threshold value is exceeded to be an elastic waveform, and stores an AE source signal having an amplitude value greater than the first threshold value. In addition, the signal processor 30 extracts an AE feature amount including information on an elastic wave on the basis of data on the elastic waveform indicated by the stored AE source signal. Meanwhile, the first threshold value is set in advance.

The signal processing performed by the signal processor 30 is, for example, noise elimination, parameter extraction, or the like. In addition, the information on the elastic wave is information such as an amplitude, an energy, a rise time, a duration, a frequency, and a zero-cross count number of the AE source signal. The signal processor 30 outputs information based on the extracted AE feature amount to the structure evaluation device 40 as an AE signal. The AE signal output by the signal processor 30 includes information such as a sensor ID, an AE arrival time, and an amplitude, an energy, a rise time, and a frequency of the AE source signal.

Here, the amplitude of the AE source signal is, for example, a maximum amplitude value among elastic waves. The energy is, for example, a value obtained by time-integrating an amplitude squared at each point in time. Meanwhile, the definition of the energy is not limited to the above-described example and may be approximated using, for example, an envelope of a waveform. The rise time is, for example, a time T1 between when the elastic wave is set to a zero value and when the elastic wave rises above a predetermined value which is set in advance. The duration is, for example, a time between when the elastic wave starts to rise to when an amplitude becomes smaller than a value which is set in advance. The frequency is a frequency of the elastic wave. The zero-cross count number is, for example, the number of times the elastic wave crosses a reference line passing through a zero value.

The structure evaluation device 40 includes a central processing unit (CPU), a memory, an auxiliary storage device, and the like which are connected to each other through a bus and executes an evaluation program. The structure evaluation device 40 functions as a device including a position locator 401, an evaluator 402, and a display 403 by executing the evaluation program. Meanwhile, some or all of the functions of the structure evaluation device 40 may be realized using hardware such as an application specific integrated circuit (ASIC), a programmable logic device (PLD), or a field programmable gate array (FPGA). In addition, the evaluation program may be registered in a computer readable storage medium. The computer readable storage medium is a portable medium such as a flexible disk, a magneto-optical disk, a ROM, a CD-ROM, or a storage device such as a hard disk embedded in a computer system. In addition, the evaluation program may be transmitted and received through an electric communication line.

The position locator 401 uses an AE signal which is output from the signal processor 30 as an input. In addition, the position locator 401 previously stores information on an installation position of the sensor 20 in the structure 50 (hereinafter, referred to as "sensor position information") in association with a sensor ID. The information on the installation position is, for example, a latitude and a longitude, distances from a specific position of the structure 50 in a horizontal direction and a vertical direction, and the like.

The position locator 401 locates the position of an elastic wave source on the basis of information such as sensors ID and AE arrival times included in the input AE signal and the sensor position information which is stored in advance. Specifically, the position locator 401 locates the position of the elastic wave source on the basis of a time when an elastic wave arrives at each sensor 20, that is, a difference between the AE arrival times. In addition, the position locator 401 generates an elastic wave source distribution using results of the position locating. The elastic wave source distribution is a distribution indicating the positions of elastic wave sources generated in the structure 50.

In addition, the position locator 401 divides a region within the elastic wave source distribution into a plurality of regions according to predetermined conditions. The position locator 401 newly sets a different threshold value for each of the regions obtained by the division. In the following description, a case where a region within an elastic wave source distribution is divided into two regions will be described for convenience of description. Thereafter, the position locator 401 locates the position of an elastic wave source again by using an AE signal having an amplitude value greater than the newly set threshold value. In addition, the position locator 401 generates an elastic wave source distribution using results of the position locating. The position locator 401 outputs the generated elastic wave source distribution to the evaluator 402.

The evaluator 402 uses the elastic wave source distribution output from the position locator 401 as an input. The evaluator 402 evaluates a deteriorated state of the structure 50 on the basis of the input elastic wave source distribution. Specifically, the evaluator 402 evaluates a deteriorated state of the structure 50 from a feature amount of an elastic wave in the elastic wave source distribution. The feature amount of the elastic wave in the elastic wave source distribution is equivalent to a density of an elastic wave source.

As specific processing, the evaluator 402 evaluates a region in which the density of the elastic wave source is less than a determination threshold value determined in advance as a region in which the structure 50 is deteriorated, on the basis of the elastic wave source distribution. For example, the density of the elastic wave source may be obtained for each region surrounded by three sensors 20, may be obtained for each region surrounded by four sensors 20, or may be obtained for each region obtained by dividing an elastic wave source distribution into predetermined regions. The evaluator 402 displays results of the evaluation on the display 403.

The display 403 is an image display device such as a liquid crystal display or an organic electro luminescence (EL) display. The display 403 displays results of the evaluation under the control of the evaluator 402. The display 403 may he an interface for connecting the image display device to the structure evaluation device 40. In this case, the display 403 generates a video signal for displaying results of the evaluation and outputs the video signal to the image display device connected to the display 403.

Next, as described above, the reason for setting a new threshold value will be described.

When a distribution of position locating results of elastic wave sources is not uniform in a case where an impact 11 is imparted to the structure 50 with a uniform distribution, a region having a reduced density can be determined to be a damaged region. However, even when the impact 11 is imparted to an undamaged sound structure with a uniform distribution, a distribution of elastic wave sources of which the positions are located may not be uniform.

Figure 2:
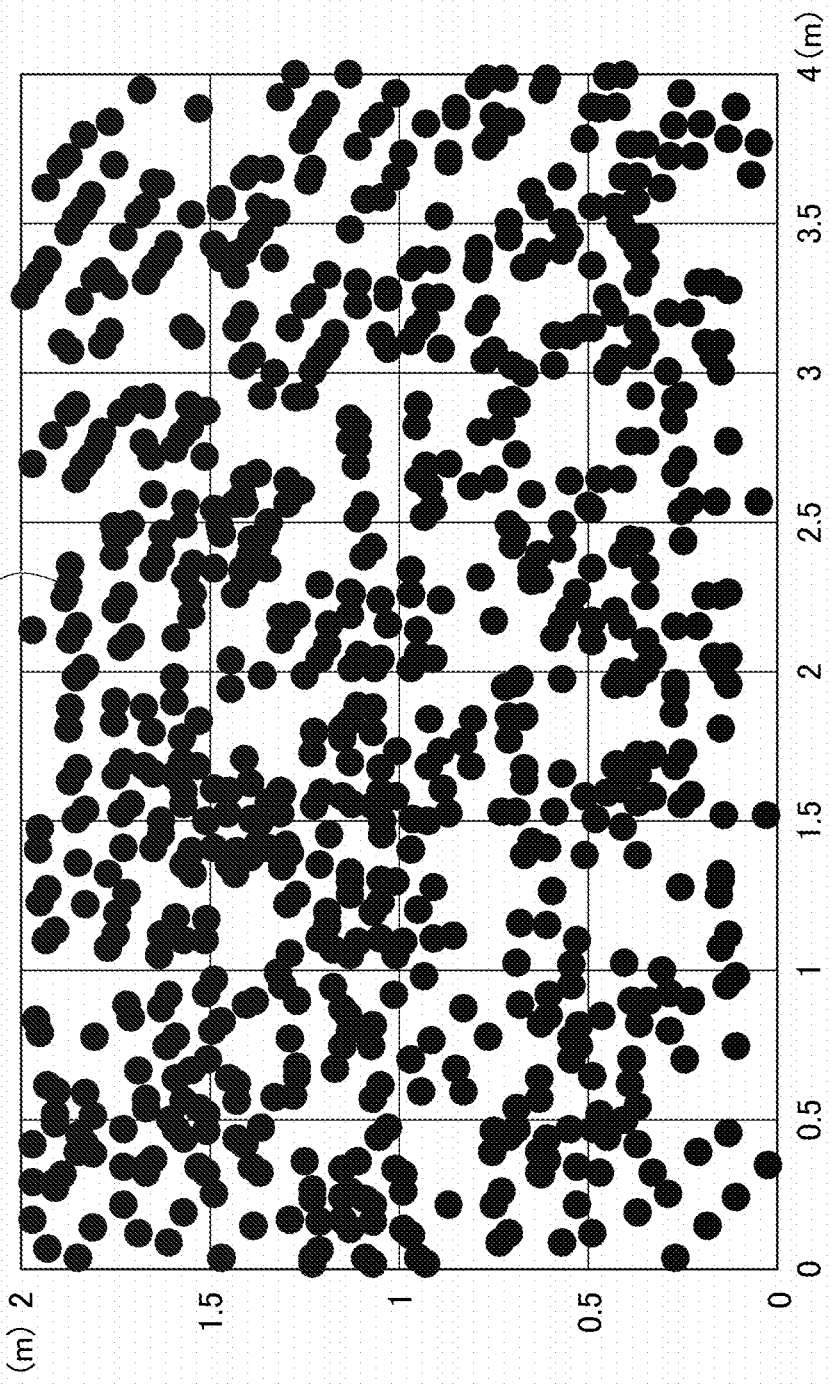
FIG. 2 is a diagram showing a position where a uniform impact is imparted randomly.

FIG. 2 is a diagram showing a position where a uniform impact 11 is imparted randomly. In FIG. 2, a vertical axis and a horizontal axis represent the length (m) of a region to be measured. A point 55 shown in FIG. 2 indicates a position where the impact 11 is imparted.

Figure 3:
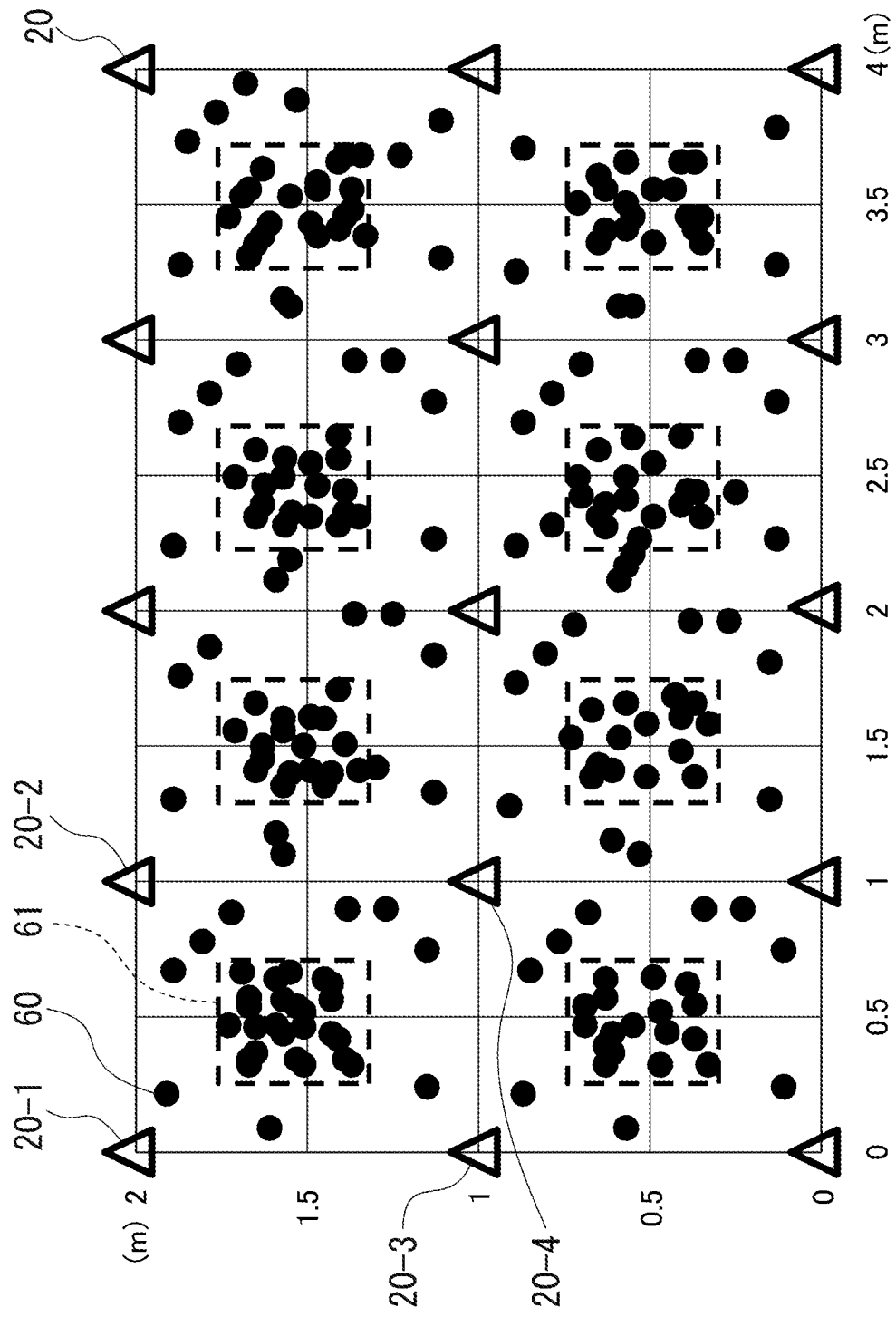
FIG. 3 is a diagram showing results obtained by locating the position of an elastic wave source in a case where a uniform impact is imparted.

In addition, FIG. 3 is a diagram showing results obtained by locating the position of an elastic wave source in a case where the uniform impact 11 as shown in FIG. 2 is imparted. In FIG. 3, a vertical axis and a horizontal axis represent the length (m) of a measurement target region. A triangle position in FIG. 3 indicates an installation position of the sensor 20. In FIG. 3, a case where 15 sensors 20 are installed is shown. The position of a point 60 in FIG. 3 indicates the position of an elastic wave source. An enlarged view of a region surrounded by four sensors 20 (the sensors 20-1 to 20-4) on an upper left side of FIG. 3 is shown in FIG. 4.

Figure 4:
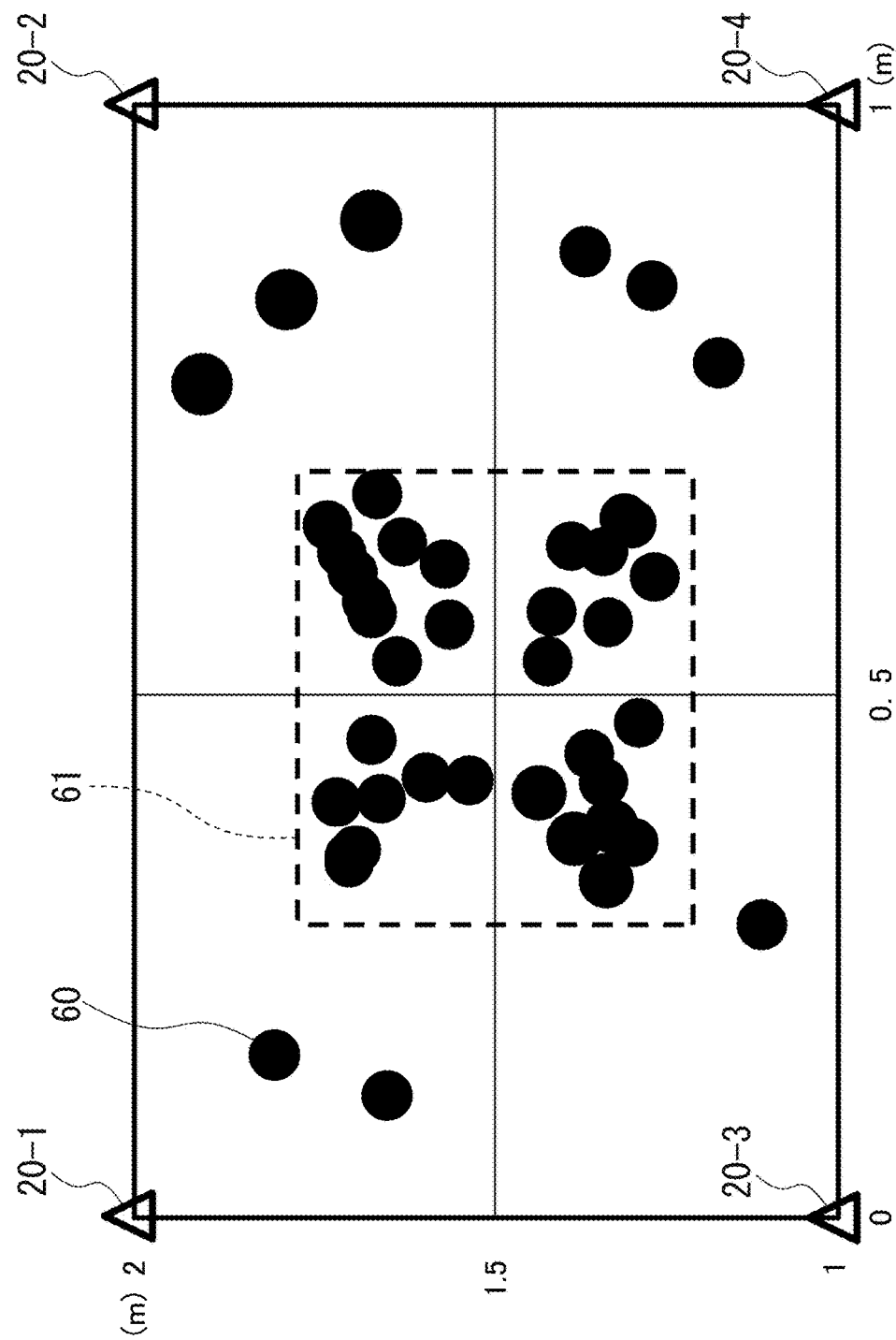
FIG. 4 is an enlarged view of a region surrounded by four sensors.

In FIG. 4, the density of an elastic wave source in the vicinity of the sensor 20 is reduced. Comparing a density inside a rectangular region 61 sectioned by a dashed line in FIG. 3 with a density outside the rectangular region 61 including an installation position of the sensor 20, it can be understood that there is a difference in the density of the elastic wave source. This results from a distance relationship between the position of the elastic wave source and the installation position of the sensor 20. The position of the elastic wave source is generally calculated on the basis of a difference in time between the four sensors 20 detecting an elastic wave.

Figure 5A:
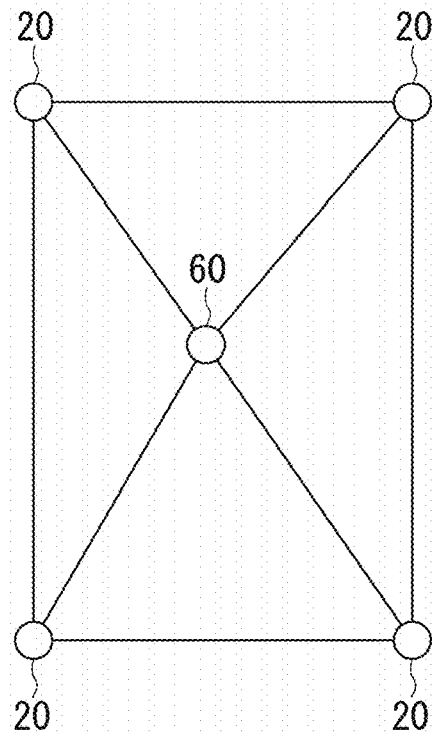
FIG. 5A is a diagram showing a distance relationship between the position of an elastic wave source and the position of a sensor at which an elastic wave arrives fourth.
Figure 5B:
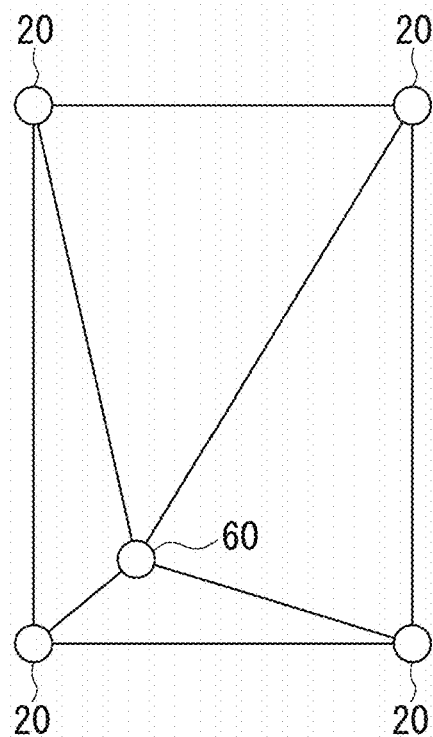
FIG. 5B is a diagram showing a distance relationship between the position of an elastic wave source and the position of a sensor at which an elastic wave arrives fourth.

FIGS. 5A and 5B diagrams show a distance relationship between the position of an elastic wave source and the position of a sensor 20 at which an elastic wave arrives fourth. In the following description, the sensor 20 at which an elastic wave arrives for the fourth time will be referred to as a 4th hit sensor. As shown in FIG. 5A, in a case where a position 60 of the elastic wave source is at the center of four sensors 20, a distance between the position 60 of the elastic wave source and the position of the 4th hit sensor is substantially the same as distances at which elastic waves arrive at the other sensors 20. Here, the other sensors 20 are a sensor 20 at which an elastic wave arrives first, a sensor 20 at which an elastic wave arrives second, and a sensor 20 at which an elastic wave arrives third. In this case, it is possible to detect elastic waves having substantially the same amplitude with all of the sensors 20. As a result, when an amplitude value of an elastic wave detected by one sensor 20 exceeds a first threshold value which is set in the signal processor 30, there is an increased probability that amplitude values of elastic waves detected by all of the sensors 20 will exceed the first threshold value. In this case, it is possible to locate the position of an elastic wave source.

On the other hand, as shown in FIG. 5B, as a position 60 of an elastic wave source approaches any one sensor 20 (the lower left sensor 20 in FIG. 5B), a distance between the position 60 of the elastic wave source and a sensor 20 (the upper right sensor 20 in FIG. 5B) which is positioned diagonally from the sensor 20 and the position 60 of the elastic wave source becomes longer than the distance between the position 60 of the elastic wave source and the position of the 4th hit sensor in FIG. 5A. The longer the distance becomes, the larger the attenuation of an elastic wave in a path becomes. In this case, an amplitude of the elastic wave is reduced. As a result, there is an increased possibility that the amplitude will not exceed the first threshold value set in the signal processor 30.

In a case where an elastic wave is not detected by the 4th hit sensor, the position of an elastic wave source is difficult to identify, and the proportion of elastic waves for which the position of an elastic wave source cannot be identified increases. For this reason, as shown in FIGS. 3 and 4, there is a difference in density between results of position locating of an elastic wave source with respect to an input of a uniform distribution. In this manner, in a case where the density of the elastic wave source deviates in the sound structure 50, there is a possibility that the structure evaluation device 40 may erroneously evaluate a region having a relatively low density as a region in which deterioration has occurred.

FIG. 6 is a diagram showing simulation results of ratios of distances between the position of an elastic wave source and the position of a 4th hit sensor in the entire measurement target region shown in FIG. 3. As shown in FIG. 5A, in a case where the position of an elastic wave source is at the center of four sensors 20, a distance between the position of the elastic wave source and the position of a 4th hit sensor is minimized. Consequently, in FIG. 6, a minimum distance between the elastic wave source and the 4th hit sensor is indicated by "1". Taking a region 12 as an example, a distance between an elastic wave source at the central point surrounded by the four sensors 20 in the region 12 and a 4th hit sensor is a minimum distance 1.

In addition, a distance between an elastic wave source at a point in the vicinity of where the sensor 20 is installed and the 4th hit sensor is a maximum. For example, a distance between the elastic wave source at a point in the vicinity of the sensor 20 installed and the 4th hit sensor is approximately twice the distance between the elastic wave source at the central point surrounded by the four sensors 20 and the 4th hit sensor. Consequently, in FIG. 6, a maximum distance from the elastic wave source to the 4th hit sensor is indicated by "2". Taking the region 12 as an example, a distance between an elastic wave source at a point in the vicinity of any one sensor 20 among the four sensors 20 in the region 12 and the 4th hit sensor is the maximum distance 2.

For this reason, as shown in FIG. 6, it is shown that a distance between an elastic wave source and a 4th hit sensor increases as the position of the elastic wave source becomes closer to one sensor 20. In addition, it is shown that a distance between the elastic wave source and the 4th hit sensor decreases as the position of the elastic wave source becomes closer to the center of the four sensors 20.

Consequently, in the structure evaluation system 100 in the present embodiment, the position locator 401 divides a measurement target region into a plurality of regions and newly sets a different threshold value for each region obtained by the division. Specifically, the position locator 401 divides the measurement target region into the plurality of regions on the basis of a distance between the position of an elastic wave source and the position of a 4th hit sensor. In addition, the position locator 401 performs position locating again using an AE signal exceeding a newly set threshold value, and thus it is possible to inhibit the above-described deviation of density and to perform more accurate examination.

FIG. 7 is a sequence diagram showing a flow of processing of the structure evaluation system 100. Meanwhile, in the processing of FIG. 7, only characteristic processes will be described using the signal processor 30 and the structure evaluation device 40.

The signal processor 30 acquires an AE source signal which is processed by the sensor 20 (step S101). The signal processor 30 compares an amplitude value of the acquired AE source signal with a first threshold value. In addition, the signal processor 30 stores the AE source signal having an amplitude value greater than the first threshold value (step S102). The signal processor 30 stores the AE source signal for a predetermined period of time. The signal processor 30 performs signal processing on the stored AE source signal (step S103). The signal processor 30 outputs information based on an extracted AE feature amount to the structure evaluation device 40 as an AE signal (step S104).

The position locator 401 locates the position of an elastic wave source on the basis of information such as a sensor ID and an AE arrival time included in the input AE signal and sensor position information stored in advance (step S105). Thereafter, the position locator 401 generates an elastic wave source distribution using results of the position locating (step S106). Meanwhile, the elastic wave source distribution obtained in the process of step S106 is a distribution having a deviation in which the disposition of the sensor 20 is reflected.

Figure 8A:
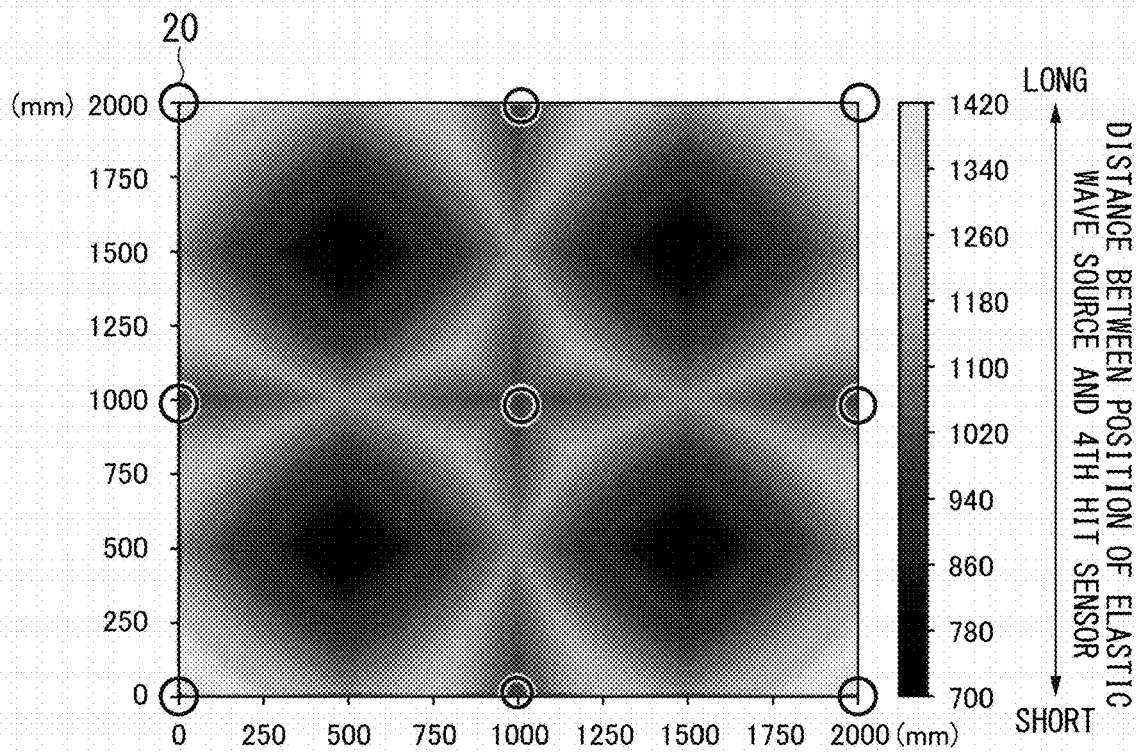
FIG. 8A is a contour diagram showing a distance from an elastic wave source to a sensor at which an elastic wave arrives fourth.

The position locator 401 generates a distance distribution indicating a distribution of distances between elastic wave sources and 4th hit sensors on the basis of the generated elastic wave source distribution and the positions of the sensors 20 disposed (step S107). For example, the position locator 401 generates a contour diagram shown in FIG. 8A as a distance distribution. FIG. 8A is a contour diagram showing a distance from an elastic wave source to a 4th hit sensor at each position in a plane where nine sensors 20 are disposed. Meanwhile, with the contour diagram, theoretical locating simulation as shown in FIG. 3 can be performed, and the density of a located point can be calculated and used.

Figure 8B:
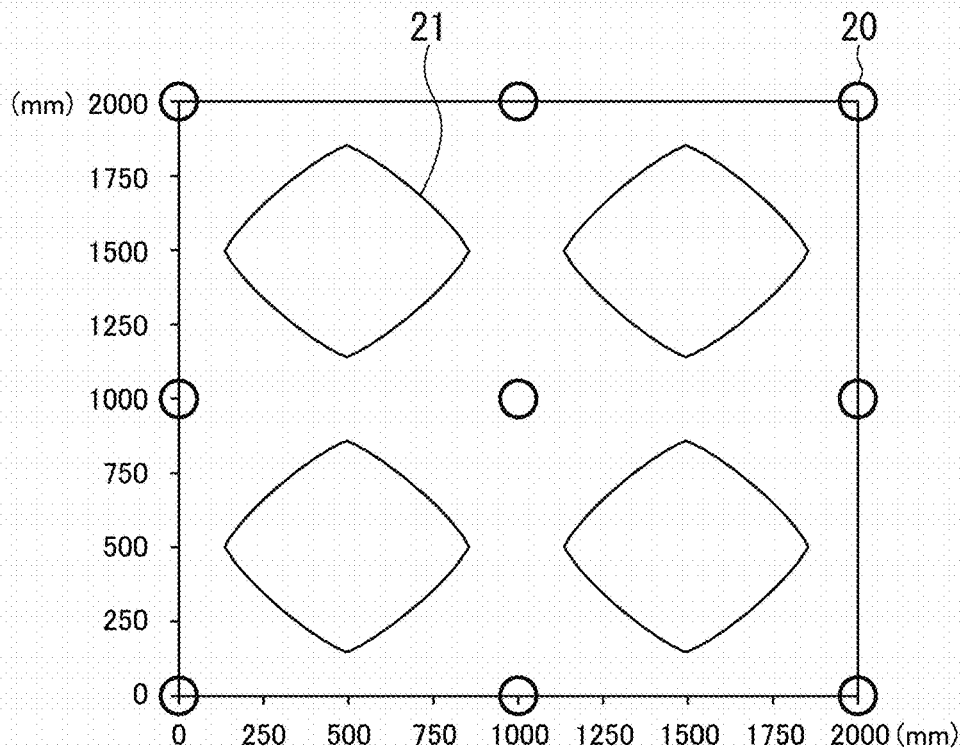
FIG. 8B is a diagram showing an example of a region dividing line.

Next, the position locator 401 sets a contour line 21 as a region dividing line by drawing the contour line 21 using any distance (a distance from the elastic wave source to the 4th hit sensor) as shown in FIG. 8B using the generated distance distribution (step S108). FIG. 8B is a diagram showing an example of a region dividing line. A reference distance for drawing the contour line 21 by the position locator 401 is set in advance. Meanwhile, in FIGS. 8A and 8B, a case where nine sensors 20 are disposed is described. However, in a case where 15 sensors 20 are disposed in a measurement target region as shown in FIG. 3, the position locator 401 generates a contour diagram according to this case.

Thereafter, the position locator 401 sets a threshold value for each region obtained by the division using the region dividing line (step S109). Here, the position locator 401 sets a threshold value for a region inside the region dividing line and a threshold value for a region outside the region dividing line. The region inside the region dividing line is a region inside the contour line 21. The region outside the region dividing line is a region outside the contour line 21. Meanwhile, the position locator 401 may use the contour line 21 as it is as the region dividing line or may use an appropriate shape such as a rectangle or an ellipse as shown in FIG. 3 on the basis of the contour line 21 or the position of the sensor 20 disposed.

A method of setting a threshold value for each region obtained by division using a region dividing line will be described.

Figure 9:
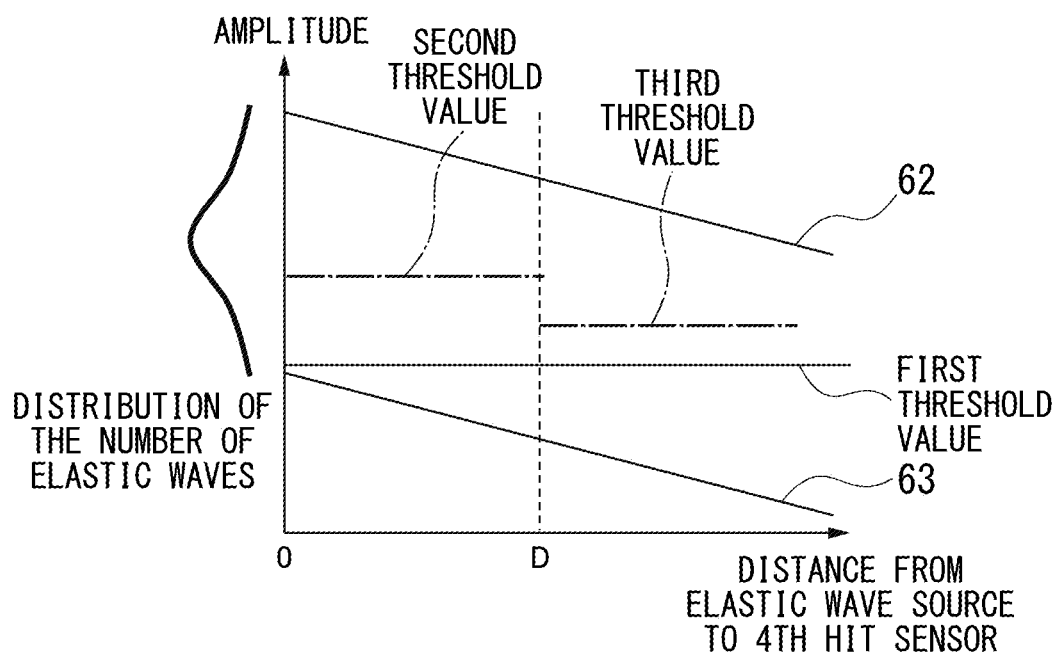
FIG. 9 is a diagram showing a method of setting a threshold value for each region.

FIG. 9 is a diagram showing a method of setting a threshold value for each region. It is assumed that the number of elastic waves to be measured has a normal distribution with respect to an amplitude. In FIG. 9, a vertical axis represents an amplitude of an elastic wave, and a horizontal axis represents a distance from an elastic wave source to a 4th hit sensor. In the horizontal axis, D indicates the position of a region dividing line obtained on the basis of, for example, the contour diagram as shown in FIG. 8A. A segment 62 shown in FIG. 9 indicates an upper limit of an amplitude of an elastic wave with respect to a distance from an elastic wave source to a 4th hit sensor. A segment 63 shown in FIG. 9 indicates a lower limit of an amplitude of an elastic wave with respect to a distance from an elastic wave source to a 4th hit sensor. Since the amplitude of the elastic wave is attenuated as a propagation distance of the elastic wave becomes longer, the detected amplitude is represented by a right-downward line.

The above-described attenuation characteristics, an amplitude distribution of elastic waves, and the like can be determined, for example, by measurement in a preliminary test using a measurement target, a structure similar to the measurement target, a sound specimen, or the like. In addition, an estimated value can be calculated in advance from materials, structures, and the like, and the calculated estimated value can be used. Since a first threshold value is provided by the signal processor 30 when an elastic wave is measured, an elastic wave having an amplitude less than the first threshold value is not used for position locating of an elastic wave source. Therefore, the number of elastic waves to be detected and having an amplitude greater than the first threshold value is reduced as a distance from an elastic wave source to a 4th hit sensor becomes longer, resulting in a reduction in the density of position locating of the elastic wave source. Consequently, the position locator 401 divides a region on the basis of a position at the distance D.

The position locator 401 sets respective threshold values so that each region has a different threshold value, for example, by setting a threshold value for a region at a distance shorter than D to be a second threshold value and setting a threshold value for a region at a distance longer than D to be a third threshold value. The region at a distance shorter than D is a region inside the region dividing line. The region at a distance longer than D is a region outside the region dividing line. For example, the position locator 401 may adjust the second threshold value and the third threshold value so that the number of elastic waves having a distance shorter than D and having an amplitude greater than the second threshold value and the number of elastic waves having a distance longer than D and having an amplitude greater than the third threshold value become substantially equal to each other. Thereby, it is possible to adjust position locating densities of elastic wave sources of the short distance region and the long distance region such that they become equal. In the example of FIG. 9, the position locator 401 performs setting so that the second threshold value and the third threshold value are greater than the first threshold value and the second threshold value is greater than the third threshold value.

The position locator 401 selects an AE signal exceeding the second threshold value and the third threshold value which are newly set, from among the stored AE signals (step S110). Specifically, the position locator 401 selects an AE signal exceeding the second threshold value from among the stored AE signals used for position locating of an elastic wave source within the region at a distance shorter than D. The position locator 401 selects an AE signal exceeding the third threshold value from among the stored AE signals used for position locating of an elastic wave source within the region at a distance longer than D.

In addition, the position locator 401 locates the position of an elastic wave source again by using the selected AE signal. Thereafter, the position locator 401 generates an elastic wave source distribution using results of the position locating (step S111). The position locator 401 outputs the generated elastic wave source distribution to the evaluator 402. In the obtained elastic wave source distribution, a deviation caused by the disposition of the sensor 20 is corrected. In this distribution, the evaluator 402 can evaluate a structure more accurately by diagnosing a portion in which the density of an elastic wave source is reduced as damage.

The evaluator 402 evaluates a deteriorated state of the structure 50 on the basis of the elastic wave source distribution which is output from the position locator 401 (step S112). Specifically, the evaluator 402 determines whether or not the obtained density of the elastic wave source is uniform on the basis of the elastic wave source distribution. In a case where the obtained density of the elastic wave source is uniform, the evaluator 402 determines that the structure is in a sound state.

On the other hand, in a case where the obtained density of the elastic wave source is not uniform, the evaluator 402 determines that the structure is deteriorated. In this case, the evaluator 402 evaluates a region in which the density of the elastic wave source is less than a predetermined determination threshold value as a region in which the structure 50 is deteriorated. The display 403 displays results of the evaluation under the control of the evaluator 402 (step S113).

Figure 10:
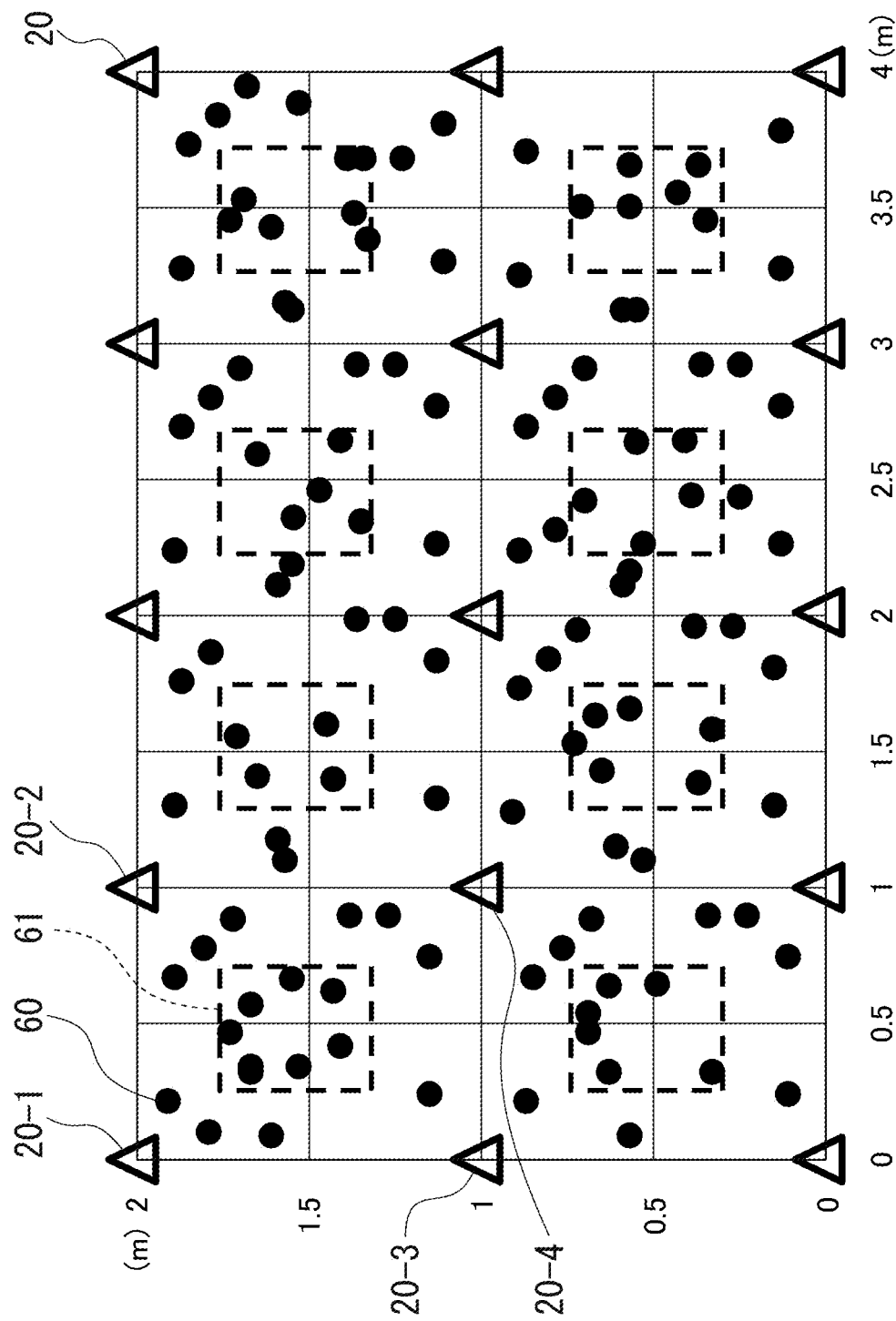
FIG. 10 is a diagram showing effects using a method in the present embodiment.

FIG. 10 is a diagram showing effects using the above-described method. In FIG. 10, a region dividing line is indicated by a dashed line 61 shown in FIG. 3 in order to simplify comparison with FIG. 3. In addition, a threshold value inside the region dividing line is set to be greater than a threshold value outside the region dividing line. As shown in FIG. 10, a difference in density is large for each region in FIG. 3, while a difference in density can be made smaller in both regions in FIG. 10 than in FIG. 3.

According to the structure evaluation system 100 configured as described above, it is possible to improve the accuracy of evaluation of a deteriorated state of a structure. Specifically, first, the structure evaluation system 100 divides a measurement target region into a plurality of regions on the basis of the position of an elastic wave source and the position of a 4th hit sensor. Next, the structure evaluation system 100 sets a different threshold value for each region obtained by the division. In this case, the structure evaluation system 100 sets a threshold value for a region in which a distance between the position of an elastic wave source and the position of a 4th hit sensor is short to be greater than a threshold value for a region in which a distance between the position of an elastic wave source and the position of a 4th hit sensor is long. Thereby, an elastic wave in the region in which the distance from the elastic wave source to the 4th hit sensor is short is difficult to detect. In addition, the structure evaluation system 100 locates the position of an elastic wave source using an elastic wave having an amplitude exceeding a set threshold value. Thereby, even when an impact 11 uniformly distributed in a case where the structure 50 is not damaged is imparted to the structure, the density of the elastic wave source becomes uniform as a result of the position locating. As a result, a sound structure is not erroneously evaluated as a deteriorated structure. For this reason, it is possible to improve the accuracy of evaluation of a deteriorated state of the structure.

Hereinafter, a modification example of the structure evaluation system 100 in the first embodiment will be described.

Figure 11A:
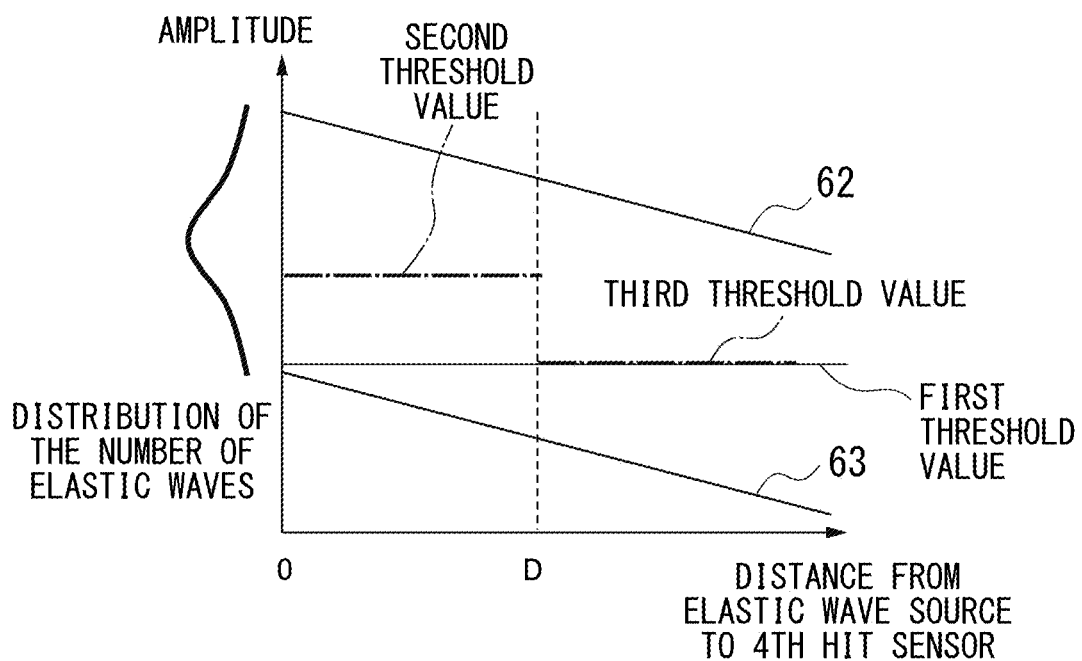
FIG. 11A is a diagram showing another example of a method of setting a new threshold value.

In the present embodiment, the position locator 401 is configured to set a newly set threshold value (for example, a second threshold value and a third threshold value) to be greater than a first threshold value, but the newly set threshold value is not limited thereto. For example, the position locator 401 may set a threshold value inside a region dividing line to be greater than the first threshold value and may be set a threshold value outside the region dividing line to be the same as the first threshold value. FIG. 11A is a diagram showing another example of a method of setting a new threshold value. As shown in FIG. 11A, the position locator 401 sets a second threshold value in a region at a distance shorter than D to be greater than a first threshold value and sets a third threshold value in a region at a distance longer than D to be the same as the first threshold value.

Figure 11B:
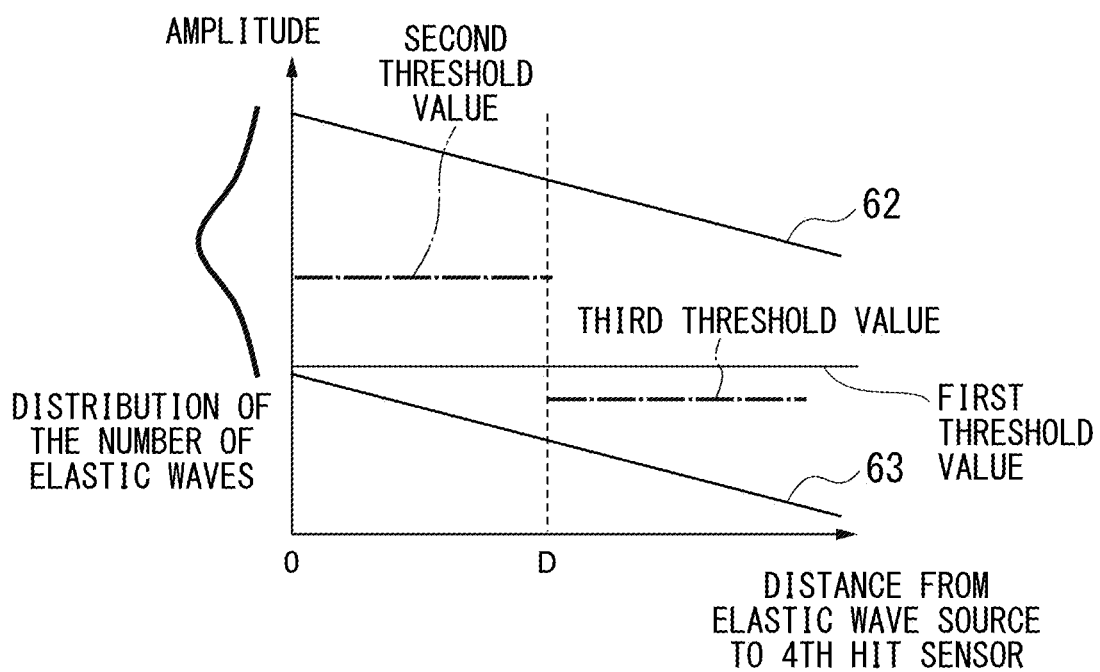
FIG. 11B is a diagram showing another example of a method of setting a new threshold value.

In addition, for example, the position locator 401 may set a threshold value inside a region dividing line to be greater than the first threshold value and may set a threshold value outside the region dividing line to be smaller than the first threshold value. FIG. 11B is a diagram showing another example of a method of setting a new threshold value. As shown in FIG. 11B, the position locator 401 sets a second threshold value in a region at a distance shorter than D to be greater than a first threshold value and sets a third threshold value in a region at a distance longer than D to be smaller than the first threshold value. As shown in FIG. 11B, in a case where a threshold value outside a region dividing line is set to be smaller than the first threshold value, the position locator 401 is also required to acquire an AE signal not exceeding the first threshold value from the signal processor 30.

The number of regions obtained by division performed by the position locator 401 is not required to be two, and a plurality of regions may be set in a stepwise manner. For example, the position locator 401 may set a region dividing line for each distance obtained by a distance distribution and divide the region in a stepwise manner or may set a region dividing line for each specific distance among distances obtained by a distance distribution and divide the region in a stepwise manner. In addition, the position locator 401 may finely divide the area and set consecutive threshold values corresponding to distances. Meanwhile, it is preferable that the position locator 401 set a newly set threshold value to be greater than the first threshold value when a distance from an elastic wave source to a 4th hit sensor is short in a region.

The structure evaluation device 40 may be configured to switch a mode in a case where characteristics of impacts are different such as when an artificial impact (for example, an impact which is manually input or an impact which is input using the impact imparting unit 10) is input and when natural rainfall occurs. In a case where the structure evaluation device 40 is configured in this manner, the position locator 401 stores a standard for setting a region dividing line and a method of setting a new threshold value for each mode. In addition, the position locator 401 performs processing by switching in accordance with a mode.

(Second Embodiment)

In a second embodiment, a structure evaluation system generates an elastic wave source density distribution without setting a new threshold value and corrects the elastic wave source density distribution to evaluate a deteriorated state of a structure.

Figure 12:
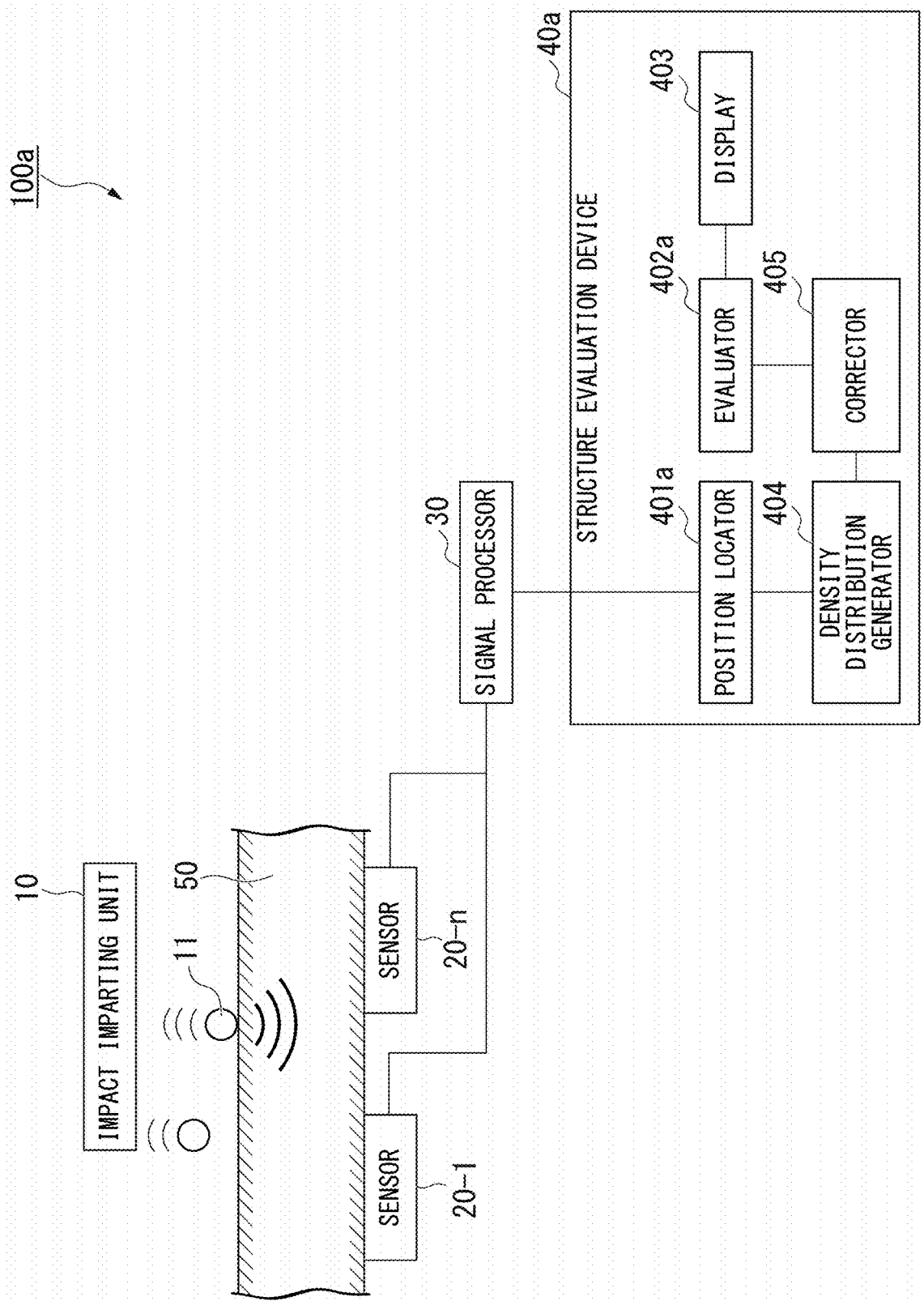
FIG. 12 is a diagram showing a configuration of a structure evaluation system in a second embodiment.

FIG. 12 is a diagram showing a configuration of a structure evaluation system 100a in the second embodiment.

The structure evaluation system 100a includes an impact imparting unit 10, a plurality of sensors 20-1 to 20-n, a signal processor 30, and a structure evaluation device 40a. The structure evaluation system 100a is configured differently from the structure evaluation system 100 in that the structure evaluation system 100a includes the structure evaluation device 40a instead of the structure evaluation device 40. Hereinafter, only the structure evaluation device 40a will be described.

The structure evaluation device 40a includes a CPU, a memory, an auxiliary storage device, and the like which are connected to each other through a bus, and executes an evaluation program. The structure evaluation device 40a functions as a device including a position locator 401a, an evaluator 402a, a display 403, a density distribution generator 404, and a corrector 405 by executing the evaluation program. Meanwhile, some or all of the functions of the structure evaluation device 40a may be realized using hardware such as ASIC, PLD, or FPGA. In addition, the evaluation program may be recorded in a computer readable storage medium. The computer readable storage medium is a portable medium such as a flexible disk, a magneto-optical disk, a ROM, a CD-ROM, or a storage device such as a hard disk embedded in a computer system. In addition, the evaluation program may be transmitted and received through an electric communication line.

The structure evaluation device 40a is configured differently from the structure evaluation device 40 in that the structure evaluation device 40a includes the position locator 401a and the evaluator 402a instead of the position locator 401 and the evaluator 402 and newly includes the density distribution generator 404 and the corrector 405. The structure evaluation device 40a is the same as the structure evaluation device 40 in regards to the other components. For this reason, only the position locator 401a, the evaluator 402a, the density distribution generator 404, and the corrector 405 will be described.

The position locator 401a locates the position of an elastic wave source on the basis of information such as sensors ID and AE arrival times included in an input AE signal and sensor position information which is stored in advance. A method of locating the position of an elastic wave source is the same as that in the first embodiment, and thus description thereof will be omitted. In addition, the position locator 401a generates an elastic wave source distribution using results of position locating. The position locator 401a outputs the generated elastic wave source distribution to the density distribution generator 404.

The density distribution generator 404 generates an elastic wave source density distribution using the generated elastic wave source distribution. The elastic wave source density distribution is a distribution in which the density of an elastic wave source is shown. The density distribution generator 404 outputs the generated elastic wave source density distribution to the corrector 405.

Figure 13A:
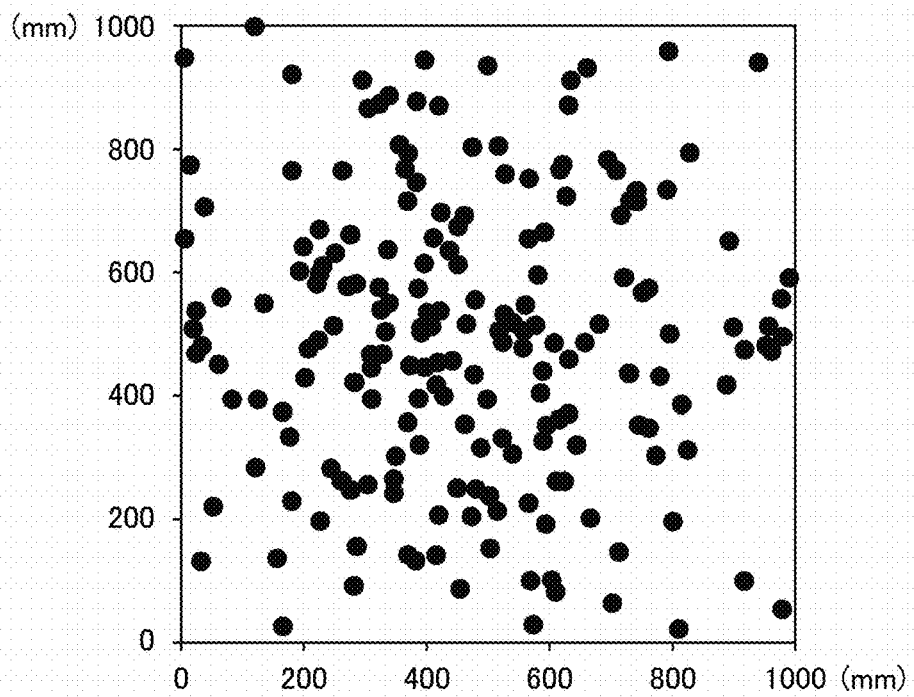
FIG. 13A is a diagram showing an example of an elastic wave source distribution.
Figure 13B:
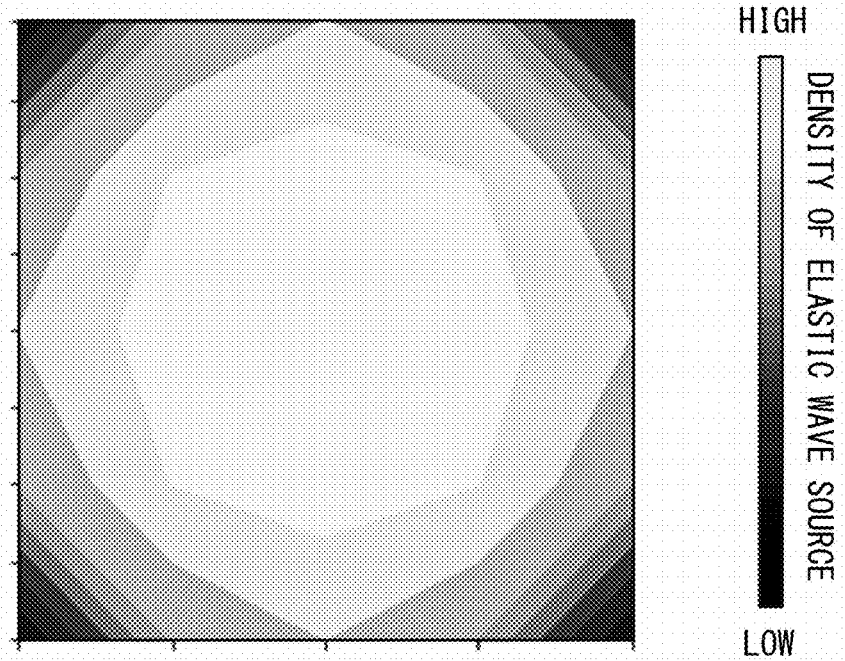
FIG. 13B is a diagram showing an example of an elastic wave source density distribution.

FIG. 13A is a diagram showing an example of an elastic wave source distribution, and FIG. 13B is a diagram showing an example of an elastic wave source density distribution obtained on the basis of the elastic wave source distribution shown in FIG. 13A. In FIG. 13A, a vertical axis and a horizontal axis represent the length (m) of a region to be measured. In FIG. 13A, elastic wave sources are concentrated in the vicinity of the center, and it can be understood that the number of elastic wave sources is reduced as a position becomes farther from the center. By generating the elastic wave source density distribution as shown in FIG. 13B, it is possible to easily determine where the density of an elastic wave source is high.

The corrector 405 corrects the elastic wave source density distribution by multiplying the generated elastic wave source density distribution by a correction coefficient $1/F(x,y)$. The corrector 405 outputs the corrected elastic wave source density distribution to the evaluator 402a. Meanwhile, in a sound structure 50, a correction coefficient is determined such that the corrected elastic wave source density distribution becomes uniform. In more detail, the correction coefficient is determined, for example, by the following method. The correction coefficient is a coefficient for correcting a deviation of the density of an elastic wave source corresponding to the position of a sensor 20 disposed. For this reason, a reciprocal of a probability $F(x,y)$ that position locating is performed correctly may be multiplied for each position of an elastic wave source. A reference position $(0, 0)$ of $(x,y)$ is, for example, an upper left side of the elastic wave source density distribution.

$F(x,y)$ is decreased as a distance from an elastic wave source to a 4th hit sensor increases. A correspondence relationship between $F(x,y)$ and the distance from the elastic wave source to the 4th hit sensor is calculated in advance, for example, through numerical simulation based on the contour diagram as shown in FIG. 8, attenuation characteristics of an elastic wave, and the like, an experiment with the sound structure 50, or the like.

The evaluator 402a evaluates a deteriorated state of the structure on the basis of the elastic wave source distribution corrected by the corrector 405. The evaluator 402a displays results of the evaluation on the display 403.

Figure 14:
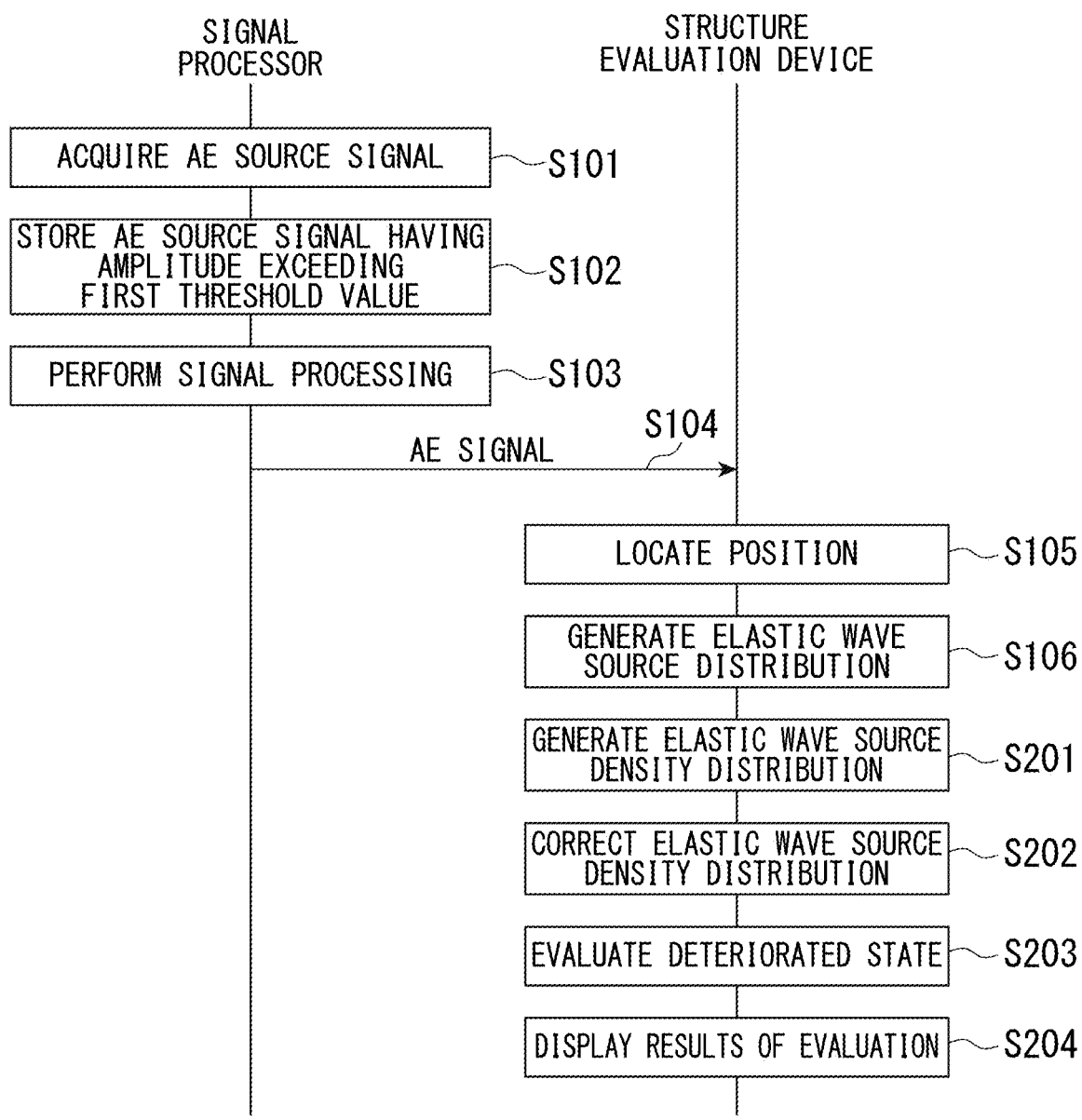
FIG. 14 is a sequence diagram showing a flow of processing of the structure evaluation system in the second embodiment.

FIG. 14 is a sequence diagram showing a flow of processing of the structure evaluation system 100a. Meanwhile, in the processing of FIG. 14, only characteristic processes will be described using the signal processor 30 and the structure evaluation device 40a. Further, in FIG. 14, the same processes as those in FIG. 7 will be denoted by the same reference numerals as those in FIG. 7, and description thereof will he omitted.

The position locator 401a outputs the elastic wave source distribution generated in the process of step S106 to the density distribution generator 404. The density distribution generator 404 generates an elastic wave source density distribution using the elastic wave source distribution which is output from the position locator 401a (step S201). The density distribution generator 404 outputs the generated elastic wave source density distribution to the corrector 405. The corrector 405 corrects the elastic wave source density distribution by multiplying the generated elastic wave source density distribution by a correction coefficient 1/F(x, y) (step S202).

The corrector 405 outputs the corrected elastic wave source density distribution to the evaluator 402a. The evaluator 402a evaluates a deteriorated state of the structure on the basis of the elastic wave source density distribution corrected by the corrector 405 (step S203). Specifically, the evaluator 402a determines whether or not the density of the elastic wave source density distribution is uniform, on the basis of the corrected elastic wave source density distribution. In a case where the density indicated by the elastic wave source density distribution is uniform, the evaluator 402a determines that the structure is in a sound state.

On the other hand, in a case where the density indicated by the elastic wave source density distribution is not uniform, the evaluator 402a determines that the structure is deteriorated. In this case, the evaluator 402a evaluates a region in which the density indicated by the elastic wave source density distribution is less than a predetermined determination threshold value as a region in which the structure 50 is deteriorated.

The structure evaluation system 100a configured as described above evaluates a deteriorated state of the structure 50 by correcting an elastic wave source density distribution obtained from an elastic wave source distribution by using a correction coefficient according to the disposition of the sensor 20. In a case where the structure is not damaged by correcting the elastic wave source density distribution using the correction coefficient, a density indicated by the elastic wave source density distribution becomes substantially uniform. As a result, a sound structure is not erroneously evaluated as a deteriorated structure. For this reason, it is possible to improve the accuracy of evaluation of a deteriorated state of the structure.

(Third Embodiment)

In a third embodiment, a structure evaluation system evaluates a deteriorated state of a sound structure 50 by correcting an elastic wave source density distribution obtained in the structure to be compared with a measurement result without setting a new threshold value.

Figure 15:
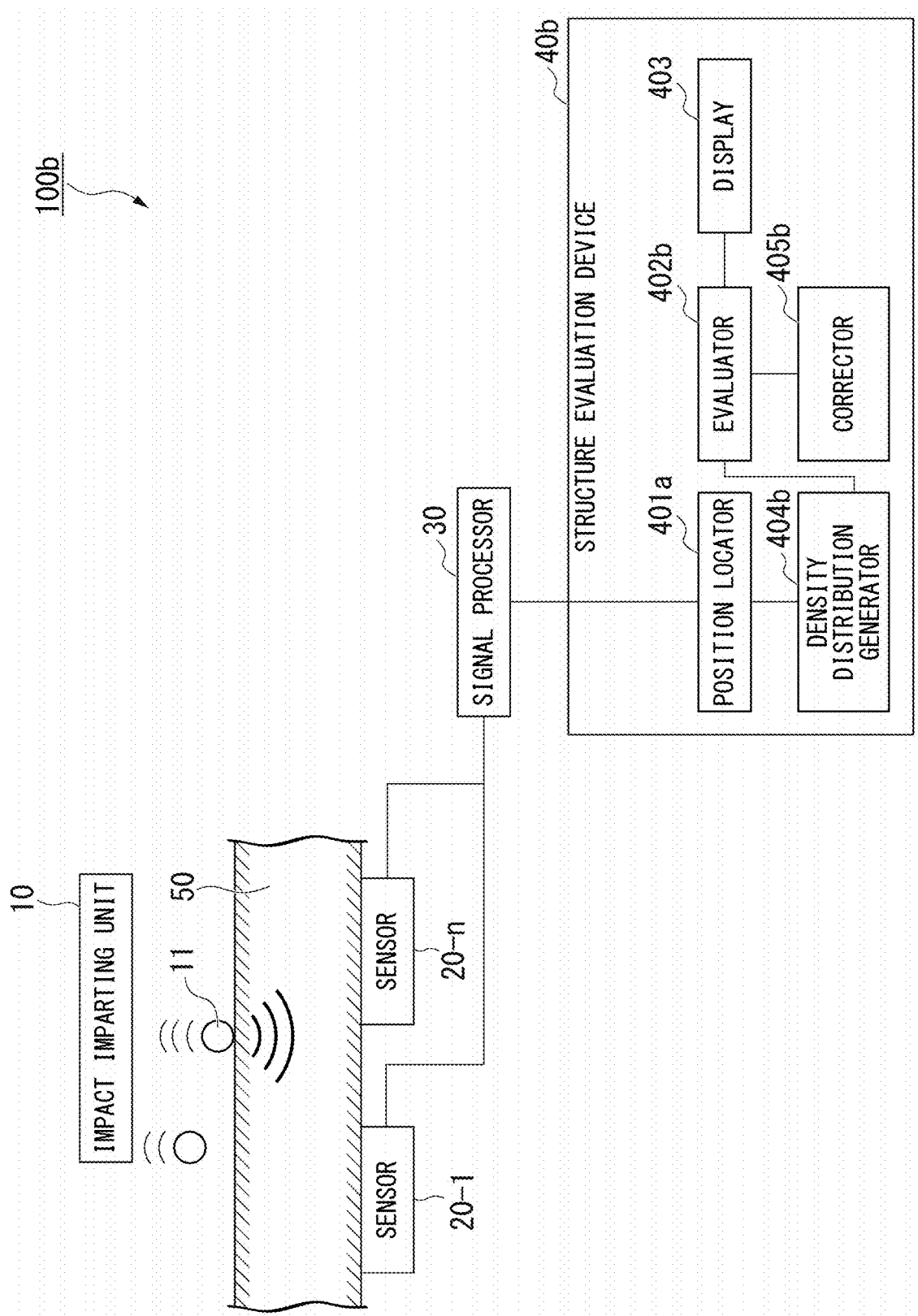
FIG. 15 is a diagram showing a configuration of a structure evaluation system in a third embodiment.

FIG. 15 is a diagram showing a configuration of a structure evaluation system 100b in the third embodiment.

The structure evaluation system 100b includes an impact imparting unit 10, a plurality of sensors 20-1 to 20-n, a signal processor 30, and a structure evaluation device 40b.

The structure evaluation system 100b is configured differently from the structure evaluation system 100a in that the structure evaluation system 100b includes the structure evaluation device 40b instead of the structure evaluation device 40a. Hereinafter, only the structure evaluation device 40b will be described.

The structure evaluation device 40b includes a CPU, a memory, an auxiliary storage device, and the like which are connected to each other through a bus, and executes an evaluation program. The structure evaluation device 40a functions as a device including a position locator 401a, an evaluator 402b, a display 403, a density distribution generator 404b, and a corrector 405b by executing the evaluation program. Meanwhile, some or all of the functions of the structure evaluation device 40b may he realized using hardware such as ASIC, PLD, or FPGA. In addition, the evaluation program may be recorded in a computer readable storage medium. The computer readable storage medium is a portable medium such as a flexible disk, a magneto-optical disk, a ROM, a CD-ROM, or a storage device such as a hard disk embedded in a computer system. In addition, the evaluation program may be transmitted and received through an electric communication line.

The structure evaluation device 40b is configured differently from the structure evaluation device 40a in that the structure evaluation device 40b includes the evaluator 402b, the density distribution generator 404b, and the corrector 405b instead of the evaluator 402a, the density distribution generator 404a, and the corrector 405a. The structure evaluation device 40b is the same as the structure evaluation device 40a in regards to the other components. For this reason, only the evaluator 402b, the density distribution generator 404b, and the corrector 405h will he described.

The density distribution generator 404b generates an elastic wave source density distribution using a generated elastic wave source distribution. The density distribution generator 404b outputs the generated elastic wave source density distribution to the evaluator 402b.

The corrector 405b corrects an elastic wave source density distribution which serves as a comparison target. Here, the elastic wave source density distribution serving as a comparison target is an elastic wave source density distribution obtained in the sound structure 50. That is, the elastic wave source density distribution serving as a comparison target is an elastic wave source density distribution having a uniform distribution. The corrector 405b may store the elastic wave source density distribution serving as a comparison target in advance or may acquire the elastic wave source density distribution serving as a comparison target from a storage device that stores it.

In addition, the corrector 405b calculates a correction magnification for each position of an elastic wave source on the basis of a deviation of a theoretical density which is separately calculated in advance or a deviation of a density which is experimentally verified. This correction magnification has a distribution such as F(x,y). The corrector 405b corrects the elastic wave source density distribution serving as a comparison target by multiplying the elastic wave source density distribution serving as a comparison target by the calculated correction magnification. Hereinafter, the corrected elastic wave source density distribution serving as a comparison target will be referred to as a post-correction standard density distribution. The corrector 405b outputs the post-correction standard density distribution to the evaluator 402b.

The evaluator 402b evaluates a deteriorated state of the structure on the basis of the elastic wave source density distribution output from the density distribution generator 404b and the post-correction standard density distribution output from the corrector 405b. The evaluator 402b displays results of the evaluation on the display 403.

Figure 16:
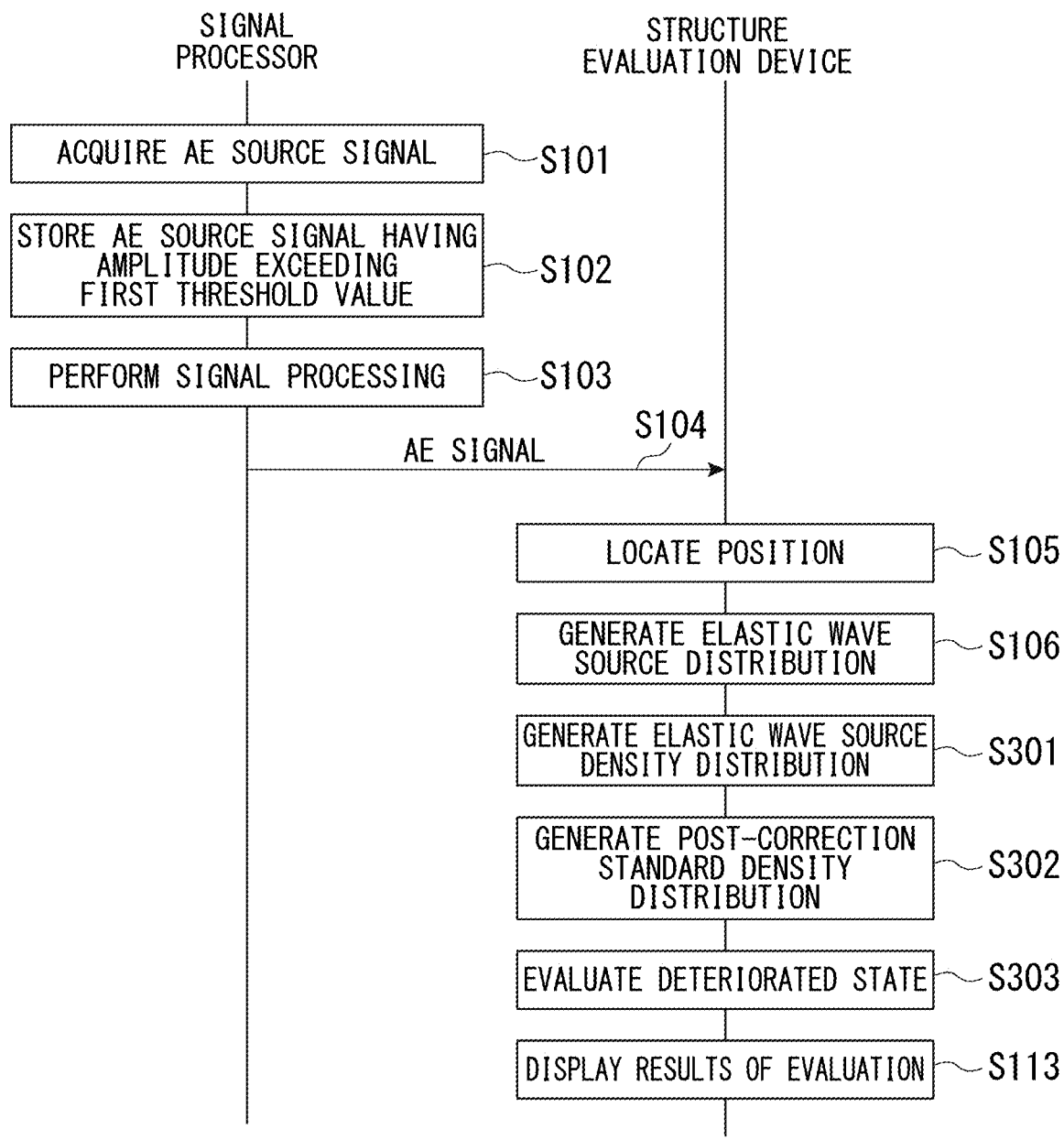
FIG. 16 is a sequence diagram showing a flow of processing of the structure evaluation system in the third embodiment.

FIG. 16 is a sequence diagram showing a flow of processing of the structure evaluation system 100b. Meanwhile, in the processing of FIG. 16, only characteristic processes will be described using the signal processor 30 and the structure evaluation device 40b. Further, in FIG. 16, the same processes as those in FIG. 14 will be denoted by the same reference numerals as those in FIG. 14, and description thereof will be omitted.

The density distribution generator 404b generates an elastic wave source density distribution using the elastic wave source distribution output from the position locator 401a (step S301). The density distribution generator 404b outputs the generated elastic wave source density distribution to the evaluator 402b. The corrector 405b corrects the elastic wave source density distribution serving as a comparison target by multiplying the elastic wave source density distribution serving as a comparison target by a correction magnification calculated for each position of an elastic wave source to generate a post-correction standard density distribution (step S302). The density distribution generator 404 outputs the generated post-correction standard density distribution to the evaluator 402b.

The evaluator 402b evaluates a deteriorated state of the structure on the basis of the elastic wave source density distribution output from the density distribution generator 404b and the post-correction standard density distribution output from the corrector 405b (step S303). Specifically, in a case where the post-correction standard density distribution and the elastic wave source density distribution are compared with each other and substantially consistent with each other, the evaluator 402b determines that the structure is in a sound state. Here, the standard of substantially consistency is set in advance.

On the other hand, the evaluator 402b compares the post-correction standard density distribution and the elastic wave source density distribution with each other and evaluates a region in which a density is reduced with respect to the post-correction standard density distribution as a region in which the structure 50 is deteriorated.

The structure evaluation system 100b configured as described above evaluates a deteriorated state of the structure 50 by correcting a reference elastic wave source distribution and comparing the elastic wave source density distribution with the corrected elastic wave source density distribution with each other. In the second embodiment, an elastic wave source density distribution in a sound state which serves as a comparison target is uniform. However, in the present embodiment, an elastic wave source density distribution serving as a comparison target is corrected. Thereby, an elastic wave source density distribution obtained by the structure 50 in a sound state which serves as a comparison target is an elastic wave source density distribution corresponding to the position of the sensor 20 disposed during measurement. In addition, the structure evaluation device 40b can compare the corrected elastic wave source density distribution with an elastic wave source density distribution obtained through actual measurement and evaluate that the structure is in a sound state in a case where the elastic wave source density distribution is substantially consistent with the corrected elastic wave source density distribution. Therefore, in a case where the elastic wave source density distribution is substantially consistent with the corrected elastic wave source density distribution, a sound structure is not erroneously evaluated as being deteriorated even when there is a region in which a density in the elastic wave source density distribution obtained through the actual measurement is less than a determination threshold value which is determined in advance. For this reason, it is possible to improve the accuracy of evaluation of a deteriorated state of the structure.

Hereinafter, a modification example which is common to the embodiments will be described.

Three or more sensors 20 may be included in each of the structure evaluation systems 100, 100a, and 100b.

Each of the structure evaluation systems 100, 100a, and 100b may not include the impact imparting unit 10. With such a configuration, the impact 11 on the structure 50 may be imparted manually.

Some or all of functional units included in the structure evaluation device 40 may be included in another housing. For example, the structure evaluation device 40 may include only the evaluator 402, and the position locator 401 and the display 403 may be included in another housing. With such a configuration, the evaluator 402 acquires an elastic wave source distribution from another housing and evaluates the soundness of the structure using the acquired elastic wave source distribution. In addition, the evaluator 402 outputs results of the evaluation to the display 403 included in the other housing.

With such a configuration, it is possible to reduce manufacturing costs of the structure evaluation device 40 by using the existing device for derivation of an elastic wave source distribution.

A first threshold value may not be set in the signal processor 30, and the signal processor 30 may consecutively store all signals during a measurement period. With such a configuration, the signal processor 30 may be configured such that the first threshold value is set after measurement is terminated. Thereby, the signal processor 30 outputs an elastic wave having an amplitude exceeding a newly set first threshold value to the structure evaluation device 40 (or the structure evaluation device 40a and the structure evaluation device 40b). As a result, it is possible to freely set a first threshold value for identifying individual elastic waves after termination of measurement by storing all signals. In addition, since all low-level signals are stored, an elastic waveform which has not once reached a first threshold value can also be acquired later by reducing a threshold value later and identifying an elastic wave again.

In addition, a first threshold value is not set in the signal processor 30, and the signal processor 30 may output all AE signals during a measurement period to the structure evaluation device 40 (or the structure evaluation device 40a and the structure evaluation device 40b). With such a configuration, the position locator 401 (or the position locator 401a and the position locator 401b) performs processing in the embodiments using acquired AE signals.

The signal processor 30 may be included in the structure evaluation device 40 (or the structure evaluation device 40a and the structure evaluation device 40b). With such a configuration, the signal processor 30 directly acquires an AE source signal processed by the sensor 20 from the sensor 20 or acquires the AE source signal through a relay device not shown in the drawing.

In FIG. 1, one signal processor 30 is connected to the plurality of sensors 20-1 to 10-n, but the structure evaluation system 100 (or the structure evaluation system 100a and the structure evaluation system 100b) may include a plurality of signal processors 30 and may be configured to include a plurality of sensor units in which the signal processors 30 are respectively connected to sensors 20.

In addition, the evaluator 402 (or the evaluator 402a and the evaluator 402b) may be operated as an output control unit. The output control unit controls an output unit so that the output unit outputs evaluation results. Here, the output unit includes the display 403, a communication unit, and a printing unit. In a case where the output unit is a communication unit, the output control unit controls the communication unit so that the communication unit transmits evaluation results to other devices. Further, in a case where the output unit is a printing unit, the output control unit controls the printing unit so that the printing unit prints evaluation results. Meanwhile, the structure evaluation device 40 (or the structure evaluation device 40a and the structure evaluation device 40b) may include some or all of the display 403, the communication unit, and the printing unit as the output unit so as to execute the above-described operations.

According to at least one of the above-described embodiments, the structure evaluation system 100 includes the plurality of sensors 20-1 to 20-N, the position locator 401, and the evaluator 402. The plurality of sensors 20-1 to 20-N detect elastic waves. The position locator 401 locates the position of an elastic wave source using an elastic wave having an amplitude exceeding a threshold value determined according to the positions of a plurality of elastic wave sources among the plurality of elastic waves detected by the plurality of sensors 20-1 to 20-N. The evaluator 402 evaluates a deteriorated state of the structure on the basis of results of the position locating of the elastic wave sources by the position locator 401. Thereby, it is possible to improve the accuracy of evaluation of a deteriorated state of the structure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A structure evaluation system comprising:
a plurality of sensors which detect elastic waves;
a position locator which locates positions of elastic wave sources on the basis of the plurality of elastic waves respectively detected by the plurality of sensors;
a density distribution generator which generates an elastic wave source density distribution representing a distribution of densities of the elastic wave sources on the basis of results of the position locating of the elastic wave sources which are performed by the position locator;
a corrector which corrects the elastic wave source density distribution by using a correction coefficient for correcting the elastic wave source density distribution in accordance with positions of the plurality of disposed sensors; and
an evaluator which evaluates a deteriorated state of the structure on the basis of the elastic wave source density distribution corrected by the corrector.

2. The structure evaluation system according to claim 1, further comprising:
a signal processor which compares amplitudes of the plurality of elastic waves respectively detected by the plurality of sensors with a first threshold value and performs signal processing on the elastic waves having an amplitude value greater than the first threshold value.

3. A structure evaluation method comprising:
a position locating step of locating positions of elastic wave sources on the basis of a plurality of elastic waves respectively detected by a plurality of sensors detecting elastic waves;
a density distribution generation step of generating an elastic wave source density distribution representing a distribution of densities of the elastic wave sources on the basis of results of the position locating of the elastic wave sources which is performed in the position locating step;
a correction step of correcting the elastic wave source density distribution by using a correction coefficient for correcting the elastic wave source density distribution in accordance with positions of the plurality of disposed sensors; and
an evaluation step of evaluating a deteriorated state of the structure on the basis of the elastic wave source density distribution corrected in the correction step.

* * * * *